(12) United States Patent
Pan et al.

(10) Patent No.: US 9,960,896 B2
(45) Date of Patent: *May 1, 2018

(54) METHOD AND APPARATUS FOR SENDING HYBRID AUTOMATIC REPEAT REQUEST FEEDBACK FOR COMPONENT CARRIER AGGREGATION

(71) Applicant: InterDigital Patent Holdings, Inc., Wilmington, DE (US)

(72) Inventors: Kyle Jung-Lin Pan, Saint James, NY (US); Allan Y. Tsai, Boonton, NY (US); Robert L. Olesen, Huntington, NY (US); Shahrokh Nayeb Nazar, Montreal (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 13/970,012

(22) Filed: Aug. 19, 2013

(65) Prior Publication Data

US 2013/0329678 A1  Dec. 12, 2013

Related U.S. Application Data

(63) Continuation of application No. 12/766,678, filed on Apr. 23, 2010, now Pat. No. 8,514,883.

(Continued)

(51) Int. Cl.
*H04L 5/00* (2006.01)
*H04L 1/16* (2006.01)
*H04L 1/18* (2006.01)

(52) U.S. Cl.
CPC .......... *H04L 5/0055* (2013.01); *H04L 1/1635* (2013.01); *H04L 1/1671* (2013.01); *H04L 1/1812* (2013.01)

(58) Field of Classification Search
CPC .. H04J 3/16; H04W 4/00; G08C 25/02; H04L 1/1621; H04L 1/1812; H04L 1/1867;
(Continued)

(56) References Cited

U.S. PATENT DOCUMENTS 7,774,686 B2 * 8/2010 Ahn ............... H04L 1/1812
714/776
8,245,092 B2 * 8/2012 Kotecha et al. ............ 714/748
(Continued)

OTHER PUBLICATIONS

Catt et al., "UL Control Channel Scheme for LTE-A," 3GPP TSG RAN WG1 meeting #55bis, R1-090188 (Jan. 12-16, 2009).
(Continued)

*Primary Examiner* — Hanh N Nguyen
(74) *Attorney, Agent, or Firm* — Condo Roccia Koptiw LLP

(57) ABSTRACT

Techniques for sending hybrid automatic repeat request (HARQ) feedback for transmissions received via a plurality of aggregated component carriers are disclosed. A wireless transmit/receive unit (WTRU) receive a plurality of codewords via a plurality of component carriers and decodes the codewords. The component carriers are grouped into a plurality of groups, and the WTRU may generate a bundled positive/negative acknowledgement (ACK/NACK) for each group of component carriers. The WTRU may be assigned a plurality of uplink control channel resources and may implement a channel selection scheme for indicating the ACK/NACKs. The WTRU selects one of the uplink control channel resources, and sets the HARQ feedback based the ACK/NACKs or bundled ACK/NACKs in a way that a different uplink control channel resource is selected and HARQ feedback bits are set differently based on the ACK/NACKs or bundled ACK/NACKs. Each physical uplink control channel (PUCCHs) may be mapped to a particular antenna.

21 Claims, 9 Drawing Sheets

Related U.S. Application Data

(60) Provisional application No. 61/172,652, filed on Apr. 24, 2009, provisional application No. 61/293,144, filed on Jan. 7, 2010.

(58) Field of Classification Search
    CPC ... H04L 1/1829; H04L 1/1858; H04L 1/1819; H04L 5/0046; H04L 5/0055
    USPC .. 370/468, 328, 208–210, 395.21, 280, 335, 370/338, 337, 329, 330; 714/748, 776, 714/746, 18, 48, 52, 750, 749; 455/450, 455/69
    See application file for complete search history.

(56) References Cited

U.S. PATENT DOCUMENTS

| | | | |
|---|---|---|---|
| 8,514,883 B2* | 8/2013 | Pan et al. | 370/468 |
| 8,614,978 B2* | 12/2013 | Che | H04L 1/1635 370/328 |
| 8,634,333 B2* | 1/2014 | Sarkar | 370/278 |
| 8,780,817 B2* | 7/2014 | Farajidana et al. | 370/329 |
| 8,934,417 B2* | 1/2015 | Nory | H04W 72/1289 370/329 |
| 8,942,080 B2* | 1/2015 | Shen | H04L 1/1614 370/208 |
| 9,402,247 B2* | 7/2016 | Bala | H04L 5/001 |
| 2009/0098876 A1 | 4/2009 | Khan et al. | |
| 2009/0129259 A1 | 5/2009 | Malladi et al. | |
| 2010/0115358 A1 | 5/2010 | Kotecha et al. | |
| 2010/0208629 A1 | 8/2010 | Ahn et al. | |
| 2010/0226327 A1* | 9/2010 | Zhang | H04B 7/0632 370/329 |
| 2017/0111899 A1* | 4/2017 | Pan | H04W 72/0413 |

OTHER PUBLICATIONS

Ericsson, "Details of ACK/NAK bundling for TDD," TSG-RAN WG1 #52bis, R1-081566 (Mar. 31-Apr. 4, 2008).
Huawei, "PUCCH design for carrier aggregation," 3GPP TSG RAN WG1 Meeting #56bis, R1-091275 (Mar. 23-27, 2009).
Panasonic, "MAC to physical layer mapping and control signaling for carrier aggregation," 3GPP TSG-RAN WG1 Meeting #55, R1-084222 (Nov. 10-14, 2008).
Third Generation Partnership Project, "Technical Specification Group Radio Access Network; Evolved Universal Terrestrial Radio Access (E-UTRA) Medium Access Control (MAC) protocol specification (Release 8)," 3GPP TS 36.321 V8.8.0 (Dec. 2009).
Third Generation Partnership Project, "Technical Specification Group Radio Access Network; Evolved Universal Terrestrial Radio Access (E-UTRA) Medium Access Control (MAC) protocol specification (Release 8)," 3GPP TS 36.321 V8.5.0 (Mar. 2009).
Third Generation Partnership Project, "Technical Specification Group Radio Access Network; Evolved Universal Terrestrial Radio Access (E-UTRA) Medium Access Control (MAC) protocol specification (Release 9)," 3GPP TS 36.321 V9.2.0 (Mar. 2010).
Third Generation Partnership Project, "Technical Specification Group Radio Access Network; Evolved Universal Terrestrial Radio Access (E-UTRA); Multiplexing and channel coding (Release 8)," 3GPP TS 36.212 V8.8.0 (Dec. 2009).
Third Generation Partnership Project, "Technical Specification Group Radio Access Network; Evolved Universal Terrestrial Radio Access (E-UTRA); Multiplexing and channel coding (Release 8)," 3GPP TS 36.212 V8.6.0 (Mar. 2009).
Third Generation Partnership Project, "Technical Specification Group Radio Access Network; Evolved Universal Terrestrial Radio Access (E-UTRA); Multiplexing and channel coding (Release 9)," 3GPP TS 36.212 V9.1.0 (Mar. 2010).
Third Generation Partnership Project, "Technical Specification Group Radio Access Network; Evolved Universal Terrestrial Radio Access (E-UTRA); Physical layer procedures (Release 9)," 3GPP TS 36.213 V9.1.0 (Mar. 2010).
Third Generation Partnership Project, "Technical Specification Group Radio Access Network; Evolved Universal Terrestrial Radio Access (E-UTRA); Physical layer procedures (Release 8)," 3GPP TS 36.213 V8.6.0 (Mar. 2009).
Third Generation Partnership Project, "Technical Specification Group Radio Access Network; Evolved Universal Terrestrial Radio Access (E-UTRA); Physical layer procedures (Release 8)," 3GPP TS 36.213 V8.8.0 (Sep. 2009).
Third Generation Partnership Project, "Technical Specification Group Radio Access Network; Evolved Universal Terrestrial Radio Access (E-UTRA); Physical Channels and Modulation (Release 9)," 3GPP TS 36.211 V9.1.0 (Mar. 2010).
Third Generation Partnership Project, "Technical Specification Group Radio Access Network; Evolved Universal Terrestrial Radio Access (E-UTRA); Physical Channels and Modulation (Release 8)," 3GPP TS 36.211 V8.6.0 (Mar. 2009).
Third Generation Partnership Project, "Technical Specification Group Radio Access Network; Evolved Universal Terrestrial Radio Access (E-UTRA); Physical Channels and Modulation (Release 8)," 3GPP TS 36.211 V8.9.0 (Dec. 2009).
Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2(Release 8)," 3GPP TS 36.300 V8.12.0 (Mar. 2010).
Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 8)," 3GPP TS 36.300 V8.8.0 (Mar. 2009).
Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 9)," 3GPP TS 36.300 V9.2.0 (Dec. 2009).
ZTE, "Uplink Control Channel Design for LTE-Advanced," 3GPP TSG RAN WG1 Meeting #56, R1-090629 (Feb. 9-13, 2009).

* cited by examiner

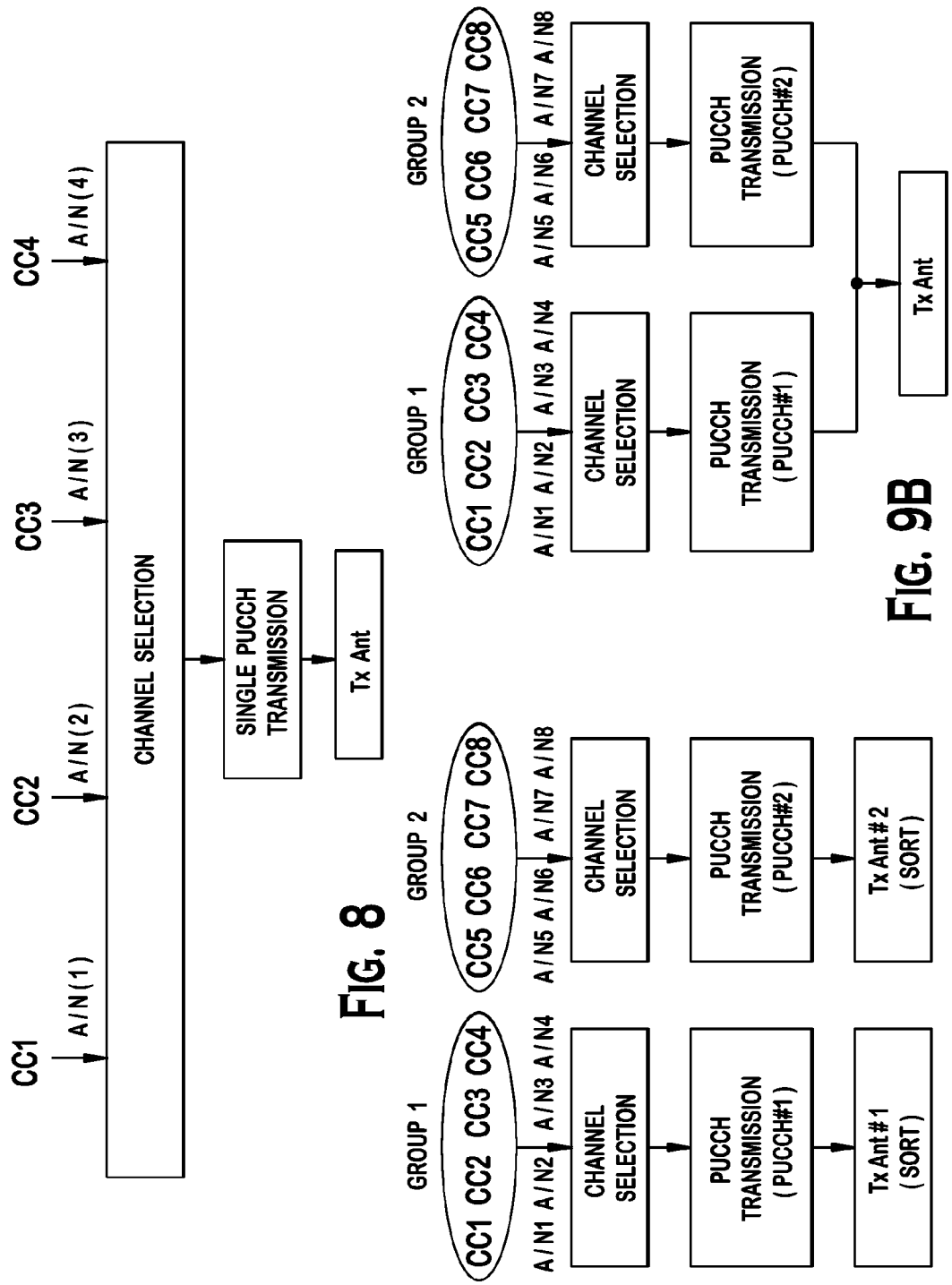

METHOD AND APPARATUS FOR SENDING HYBRID AUTOMATIC REPEAT REQUEST FEEDBACK FOR COMPONENT CARRIER AGGREGATION

CROSS REFERENCE TO RELATED APPLICATIONS

This application is a continuation of U.S. patent application Ser. No. 12/766,678 filed Apr. 23, 2010, which is now U.S. Pat. No. 8,514,883, and which claims the benefit of U.S. Provisional Application Ser. No. 61/172,652 filed Apr. 29, 2009 and 61/293,144 filed Jan. 7, 2010, the contents of which are hereby incorporated by reference herein.

FIELD OF INVENTION

This application is related to wireless communications.

BACKGROUND

In order to support higher data rates and improve spectrum efficiency, new wireless technologies have been developed. For example, the third generation partnership project (3GPP) long term evolution (LTE) system has been introduced into 3GPP Release 8 (R8).

The LTE downlink (DL) transmission scheme is based on orthogonal frequency division multiple access (OFDMA), and the LTE uplink (UL) transmission scheme is based on single-carrier (SC) discrete Fourier transform (DFT)-spread OFDMA (DFT-S-OFDMA) or equivalently, single carrier frequency division multiple access (SC-FDMA). The use of single-carrier transmission in the UL is motivated by the lower peak-to-average power ratio (PAPR) or cubic metric (CM) compared to multi-carrier transmission such as OFDM.

LTE-Advanced (LTE-A) is designed to further improve achievable throughput and coverage of LTE-based radio access systems, and to meet the IMT-Advanced requirements of 1 Gbps and 500 Mbps in the DL and UL directions, respectively. One major feature of LTE-A is bandwidth extension, or component carrier aggregation, and support of flexible bandwidth arrangement. Bandwidth extension allows DL and UL transmission bandwidths to exceed 20 MHz, (e.g., 100 MHz). It also allows for more flexible usage of the available paired spectrum. In LTE-A, operations in contiguous bandwidth aggregation or non-contiguous bandwidth aggregation are possible. Component carrier aggregation may be either symmetric or asymmetric.

One design criteria for LTE-A is to maintain the backward compatibility with LTE. In the LTE system DL direction, wireless transmit/receive units (WTRUs) receive data on the physical DL shared channel (PDSCH). The transmission of the PDSCH is scheduled by the eNodeB using a DL scheduling assignment, which is carried on a physical downlink control channel (PDCCH). As part of the DL scheduling assignment, the WTRU receives control information for the modulation and coding scheme (MCS), DL resources allocation, etc. The WTRU decodes its allocated PDSCH resources on the allocated DL resources.

In the LTE system UL direction, L1/2 control signaling, (such as hybrid automatic repeat request (HARQ) positive acknowledgement/negative acknowledgement (ACK/NACK), channel quality indication (CQI), precoding matrix indication (PMI), rank indication (RI), etc.), needs to be transmitted to support the DL transmissions, UL transmissions, scheduling, multiple-input multiple-output (MIMO), etc. If the WTRU has not been assigned a UL resource for UL data transmission, (e.g., PUSCH), then the L1/2 UL control information is transmitted on a PUCCH. The PUCCH resources are located at the edges of the total available cell bandwidth (BW). FIG. 1 shows transmission of UL control information, (i.e., HARQ ACK/NACK), in response to the reception of PDSCH in the DL in an LTE single carrier system.

The following combinations of UL control information for HARQ ACK/NACK on PUCCH for frequency division duplex (FDD) for single component carrier are supported in LTE: HARQ-ACK using PUCCH format 1a or 1b, HARQ-ACK and scheduling request (SR) using PUCCH format 1a or 1b, and CQI and HARQ-ACK using PUCCH format 2a or 2b for normal cyclic prefix and PUCCH format 2 for extended cyclic prefix.

In an LTE-A system, due to component carrier aggregation, a WTRU may receive multiple codewords via multiple DL component carriers and therefore it may be required to feed back multiple PUCCHs for HARQ ACK/NACKs in response to the reception of multiple PDSCHs in the multiple DL component carriers. However, transmitting multiple PUCCHs simultaneously may increase a CM or PAPR. This is an issue particularly in the power limited cases, such as for low power class WTRUs or when WTRUs are at cell edge. This also causes a coverage problem due to the transmit power backoff of the power amplifier at the WTRU.

SUMMARY

Embodiments for sending HARQ feedback for transmissions received via a plurality of aggregated component carriers are disclosed. A WTRU receive a plurality of codewords via a plurality of component carriers and decodes the codewords. The component carriers may be grouped into a plurality of groups, and the WTRU may generate a bundled ACK/NACK for each group of component carriers.

Alternatively or additionally, the WTRU may be assigned a plurality of UL control channel resources and may implement a channel selection scheme for indicating the ACK/NACKs. The WTRU selects one of the UL control channel resources, and sets the HARQ feedback based the ACK/NACKs or bundled ACK/NACKs in a way that a different UL control channel resource is selected and HARQ feedback bits are set differently based on the ACK/NACKs or bundled ACK/NACKs. Each PUCCH may be mapped to a particular transmit antenna among multiple transmit antennas.

Two levels of grouping may be used. DL component carriers or ACK/NACKs may be grouped into several groups for partial ACK/NACK bundling, and after the partial ACK/NACK bundling, it is further split into several groups for channel selection per group. A single PUCCH transmission may be used for each UL group after channel selection. The PUCCHs may be transmitted via a single antenna, or each PUCCH may be mapped to a particular antenna for transmission.

BRIEF DESCRIPTION OF THE DRAWINGS

A more detailed understanding may be had from the following description, given by way of example in conjunction with the accompanying drawings wherein:

FIG. 8 shows an example of channel selection for single antenna transmission in accordance with one embodiment;

FIGS. 9A and 9B show examples of DL component carrier grouping and channel selection for transmission of HARQ feedback for one and two transmit antennas, respectively;

DETAILED DESCRIPTION

When referred to hereafter, the terminology "WTRU" includes but is not limited to a user equipment (UE), a mobile station, a fixed or mobile subscriber unit, a pager, a cellular telephone, a personal digital assistant (PDA), a computer, a sensor, a machine-to-machine (M2M) device, or any other type of device capable of operating in a wireless environment. When referred to hereafter, the terminology "NodeB" or "eNodeB" includes but is not limited to a base station, a site controller, an access point (AP), or any other type of interfacing device capable of operating in a wireless environment.

Even though the embodiments are disclosed with reference to control channels and data channels associated with 3GPP LTE or LTE-A, it should be noted that the embodiments are not limited to 3GPP LTE or LTE-A, but are applicable to any wireless communication technologies that are currently existing or will be developed in the future including, but not limited to, 3GPP high speed packet access (HSPA), cdma2000, IEEE 802.xx, etc. It should also be noted that the embodiments described herein may be applicable in any order or combinations.

Figure 1:
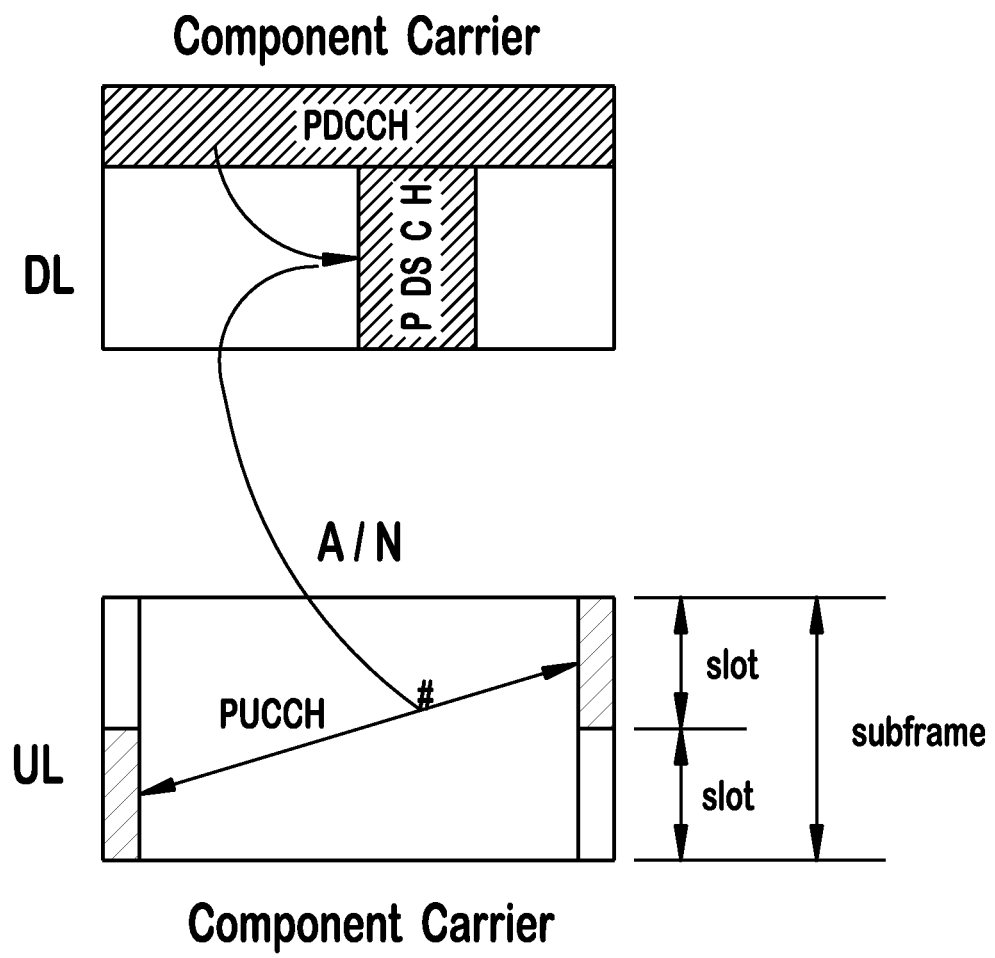
FIG. 1 shows transmission of UL control information, (i.e., HARQ ACK/NACK), in response to the reception of PDSCH in the DL in an LTE single carrier system.
Figure 2:
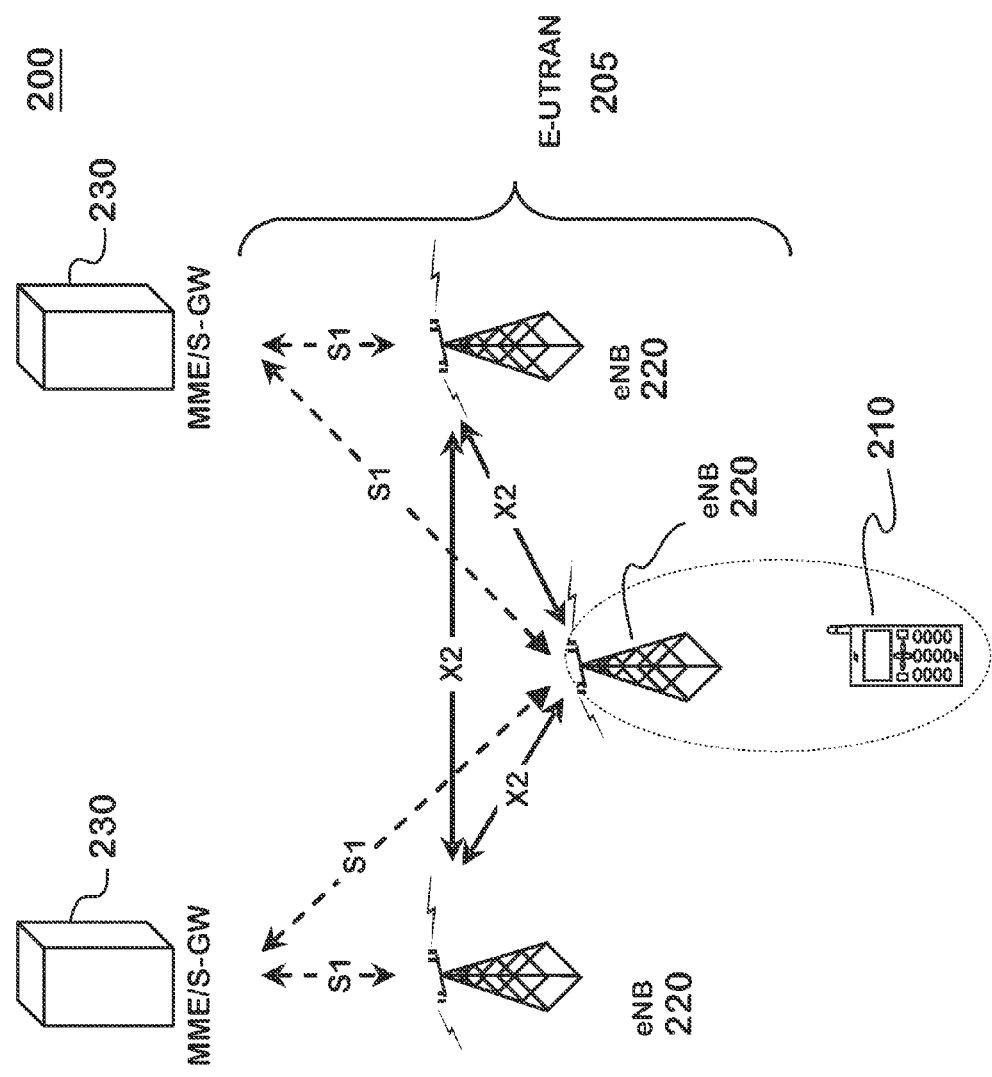
FIG. 2 shows an LTE wireless communication system/access network that includes an Evolved-Universal Terrestrial Radio Access Network (E-UTRAN)

FIG. 2 shows an LTE wireless communication system/access network 200 that includes an Evolved-Universal Terrestrial Radio Access Network (E-UTRAN) 205. The E-UTRAN 205 includes several eNodeBs 220. The WTRU 210 is in communication with an eNodeB 220. The eNodeBs 220 interface with each other using an X2 interface. Each of the eNodeBs 220 interface with a Mobility Management Entity (MME)/Serving GateWay (S-GW) 230 through an S1 interface. Although a single WTRU 210 and three eNodeBs 220 are shown in FIG. 2, it should be apparent that any combination of wireless and wired devices may be included in the wireless communication system access network 200 including relays with no wired connections and network devices that do not have the interfaces depicted in FIG. 2, (e.g., a home eNodeB (HeNodeB) that has no X2 interface.

Figure 3:
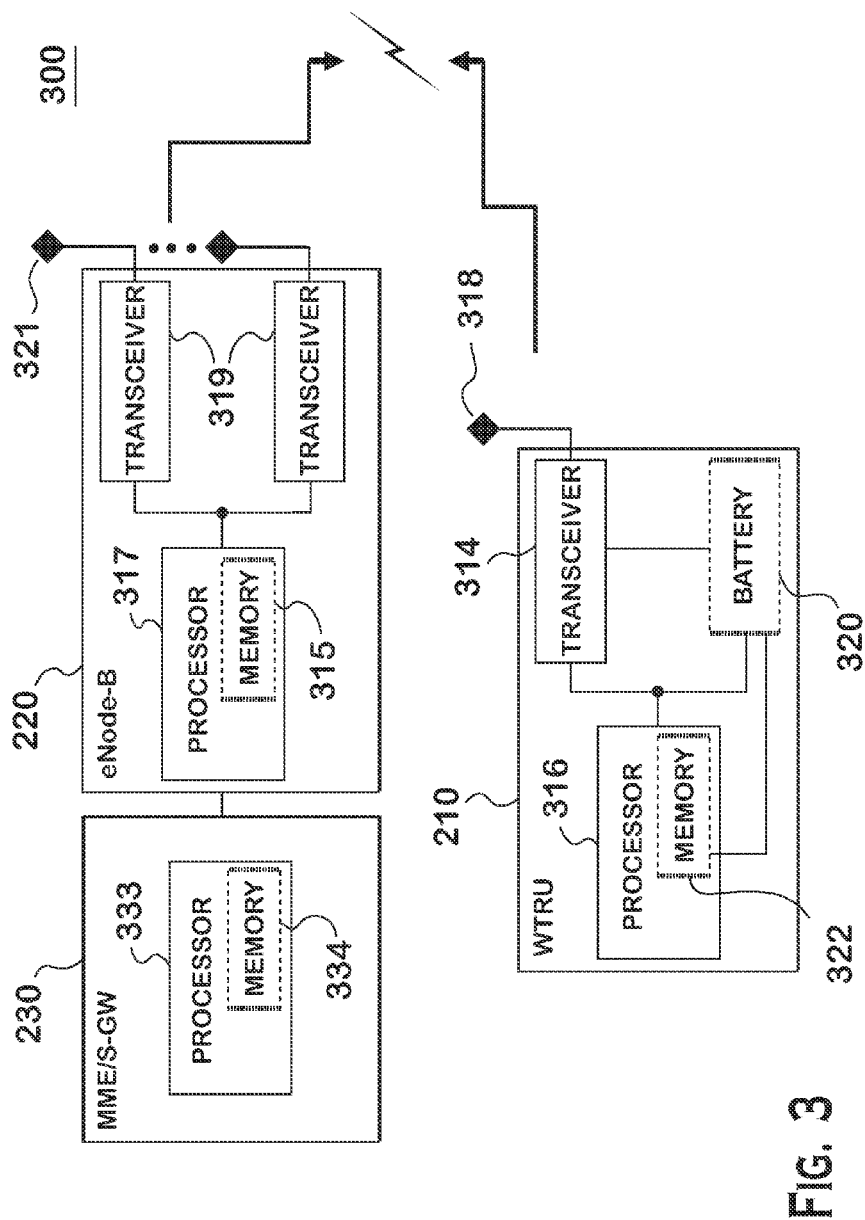
FIG. 3 is an example block diagram of an LTE wireless communication system including the WTRU, the eNodeB, and the MME/S-GW.

FIG. 3 is an example block diagram of an LTE wireless communication system 300 including the WTRU 210, the eNodeB 220, and the MME/S-GW 230. As shown in FIG. 3, the WTRU 210, the eNodeB 220 and the MME/S-GW 230 are configured to send hybrid automatic repeat request feedback for component carrier aggregation in accordance with any embodiment disclosed herein. In addition to the components that may be found in a typical WTRU, the WTRU 210 includes a processor 316 with an optional linked memory 322, at least one transceiver 314, an optional battery 320, and an antenna 318. The processor 316 is configured to send hybrid automatic repeat request feedback for component carrier aggregation in accordance with any embodiment disclosed herein. The transceiver 314 is in communication with the processor 316 and the antenna 318 to facilitate the transmission and reception of wireless communications. In case a battery 320 is used in the WTRU 210, it powers the transceiver 314 and the processor 316.

In addition to the components that may be found in a typical eNodeB, the eNodeB 220 includes a processor 317 with an optional linked memory 315, transceivers 319, and antennas 321. The processor 317 is configured to send hybrid automatic repeat request feedback for component carrier aggregation in accordance with any embodiment disclosed herein. The transceivers 319 are in communication with the processor 317 and antennas 321 to facilitate the transmission and reception of wireless communications. The eNodeB 220 is connected to the Mobility Management Entity/Serving GateWay (MME/S-GW) 230 which includes a processor 333 with an optional linked memory 334.

In accordance with one embodiment, DL component carriers (or ACK/NACKs) may be separated into at least two groups for HARQ ACK/NACK feedback purpose, and ACK/NACK bundling may be performed in each group, (i.e., partial ACK/NACK bundling in a group-basis). With ACK/NACK bundling, if there is no NACK in the group, a WTRU generates a bundled ACK for the corresponding group, and if there is at least one NACK in the group, the WTRU generates a bundled NACK for the corresponding group. The WTRU combines the ACK/NACKs together within the same group and does not combine ACK/NACKs that belong to different groups.

Figure 4:
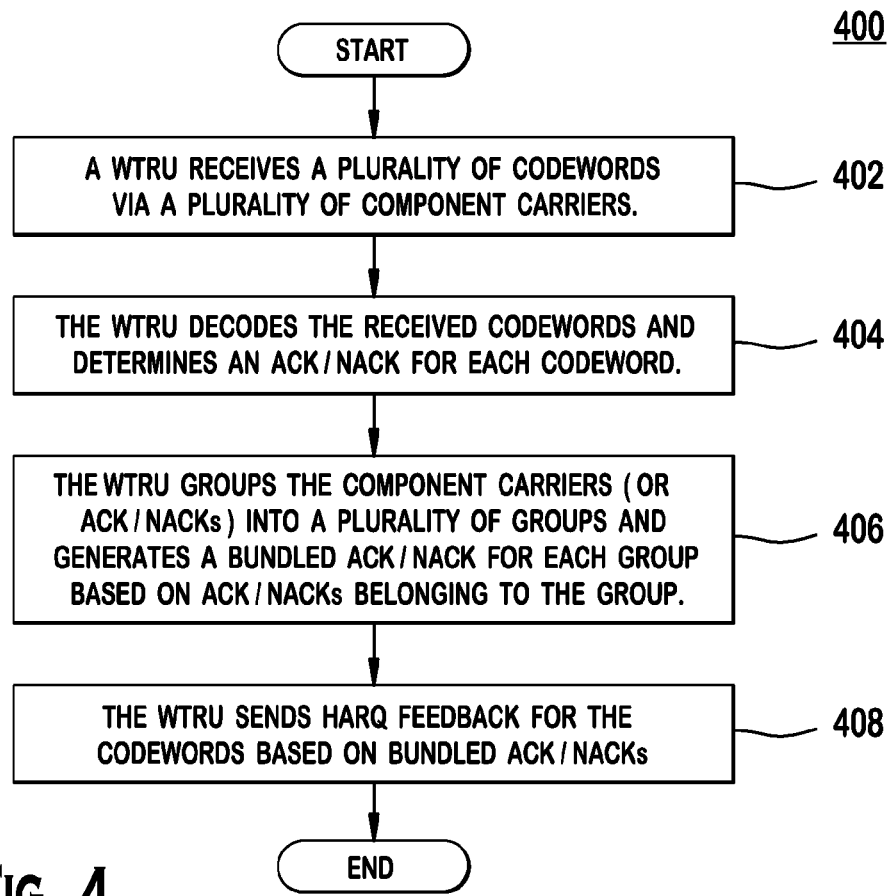
FIG. 4 is a flow diagram of an example process for partial ACK/NACK bundling in accordance with one embodiment.

FIG. 4 is a flow diagram of an example process 400 for partial ACK/NACK bundling for component carriers in accordance with one embodiment. A WTRU receives a plurality of codewords, (i.e., transport blocks (TBs)), via a plurality of DL component carriers (step 402). The WTRU decodes the received codewords and determines an ACK/NACK for each codeword (step 404). The WTRU groups the DL component carriers (or ACK/NACKs) into a plurality of groups and generates a bundled ACK/NACK for each group based on ACK/NACKs belonging to the group (step 406). When ACK/NACKs of a group are bundled, the WTRU may perform, for example, an AND operation for the ACK/NACKs belonging to the same group and generate a single ACK/NACK for that group. If all the codewords in the group are successfully decoded, a bundled ACK is generated for the group, and if at least one codeword is not successfully decoded in the group, a bundled NACK is generated for the group. The WTRU then sends HARQ feedback for the codewords based on bundled ACK/NACKs (step 408).

Figure 5:
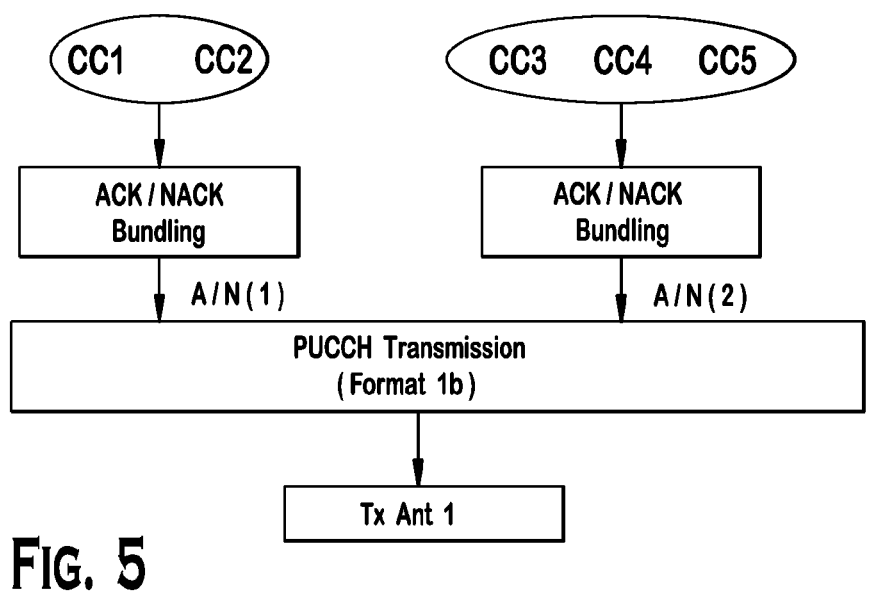
FIG. 5 shows example DL component carrier (or ACK/NACKs) grouping and partial ACK/NACK bundling for single PUCCH transmission in accordance with one embodiment.

FIG. 5 shows example DL component carrier (or ACK/NACKs) grouping and partial ACK/NACK bundling for single PUCCH transmission in accordance with one embodiment. In FIG. 5, the WTRU may be configured with five DL component carriers (CCs) and may receive one codeword, (or more than one codeword), via each DL component carrier. The applicability of this embodiment is not limited to five DL CCs, but any number equal to or greater than two DL CCs are applicable. The five DL component carriers are separated into two groups such that CC1 and CC2 are in one group and CC3, CC4, and CC5 are in the other group, and one bundled HARQ ACK/NACK bit is generated for each group. The two bundled ACK/NACK bits may be transmitted on a single UL control channel, (e.g., PUCCH using a PUCCH format 1b), via one antenna. If multiple codewords are transmitted via one component carrier, (e.g., using multiple-input multiple-output (MIMO)), the ACK/NACKs on each component carrier may be bundled together (e.g., spatial bundling). For example, if two component carriers are grouped and two codewords are transmitted via each component carrier, the WTRU may bundle four ACK/NACKs together such that if there is no NACK among the four ACK/NACKs, the WTRU generates a bundled ACK and if there is at least one NACK, the WTRU generates a bundled NACK.

Figure 6:
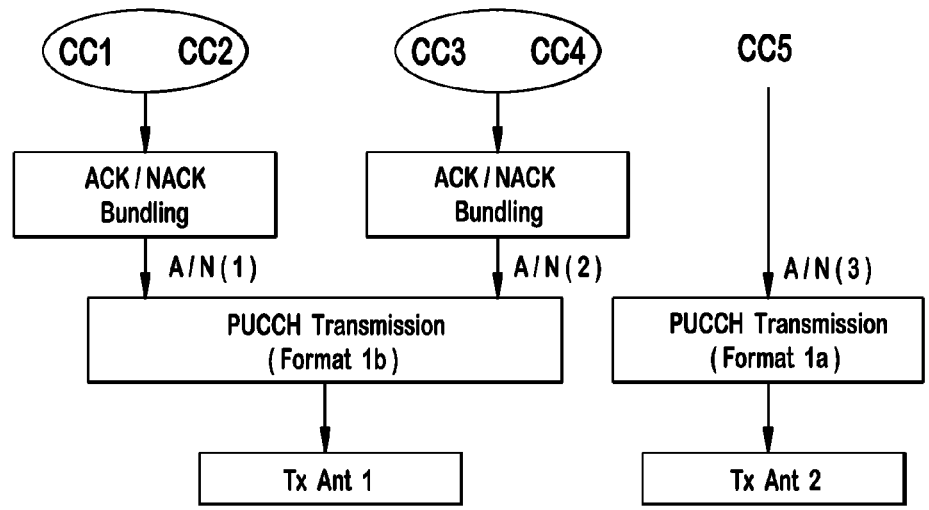
FIG. 6 shows another example DL component carrier (or ACK/NACK) grouping and ACK/NACK bundling for single PUCCH transmission per transmit antenna in accordance with another embodiment.

FIG. 6 shows another example DL component carrier (or ACK/NACK) grouping and ACK/NACK bundling. In FIG. 6, five DL component carriers are configured, as an example, for the WTRU and the component carriers are separated into three groups such that CC1 and CC2 are in a first group, CC3 and CC4 are in a second group, and CC5 is in a third group. ACK/NACKs corresponding to CC1 and CC2 are bundled, ACK/NACKs corresponding to CC3 and CC4 are bundled, and an ACK/NACK(s) corresponding to CC5 may not be bundled. This generates three ACK/NACKs (two bundled ACK/NACKs plus one unbundled ACK/NACK). The two bundled ACK/NACK bits may be transmitted via one PUCCH using PUCCH format 1b with quadrature phase shift keying (QPSK) modulation, and the unbundled ACK/NACK bit on CC5 may be transmitted via another PUCCH using PUCCH format 1a with binary phase shift keying (BPSK) modulation if one TB is transmitted on CC5 or format 1b with QPSK modulation if two TBs are transmitted on CC5. It should be noted that the configuration shown in FIG. 6 is an example, and the WTRU may be configured with any number of DL component carriers and the DL component carriers may be separated into any number of groups in any combination. The PUCCHs may be mapped to two (or more than two) transmit antennas separately on a single UL component carrier, (e.g., UL primary component carrier), and transmitted using spatial orthogonal resource transmission (SORT) such that a single PUCCH is transmitted per transmit antenna as shown in FIG. 6. By doing so, the CM or PAPR can be preserved due to single PUCCH transmission. Alternatively, the PUCCHs may be mapped to a single antenna. Alternatively, the PUCCHs may be mapped to different UL component carriers or different subframes for transmission.

With respect to grouping of component carriers or ACK/NACKs, different grouping strategies may be implemented. In accordance with one embodiment, the component carriers (or ACK/NACKs) may be grouped into as few groups as possible, (e.g., at most two groups), and the bundled ACK/NACKs may be transmitted in a single UL transmission, (e.g., a single PUCCH with format 1b), as shown in FIG. 5. This strategy reduces the CM or PAPR due to the single PUCCH transmission at the expense of possible increased HARQ retransmissions due to the increased degree of ACK/NACK bundling.

In accordance with another embodiment, the component carriers (or ACK/NACKs) may be grouped such that a limited number of component carriers (or ACK/NACKs) belong to each group, (e.g., at most two component carriers (or ACK/NACKs) in each group), and the bundled ACK/NACKs may be transmitted in multiple simultaneous PUCCH transmissions. The PUCCHs may be mapped to different antennas separately such that a single PUCCH is transmitted per transmit antenna and the PUCCHs may be transmitted using SORT. Alternatively, the PUCCHs may be mapped to a single antenna on a single UL component carrier, (e.g., UL primary component carrier). The PUCCHs may be mapped to different UL component carriers or different subframes on the same UL component carrier. This strategy may limit the impact of bundling on HARQ retransmissions with the cost of possible increased CM or PAPR if multiple PUCCHs are transmitted on a single transmit antenna. The CM or PAPR may be preserved or reduced using efficient mapping of PUCCHs to transmit antenna to achieve single PUCCH transmission.

In accordance with another embodiment, DL component carriers (or ACK/NACKs) may be grouped into a number of groups and a channel selection mechanism for reporting HARQ feedback may be performed. The channel selection mechanism will be explained in detail below. The PUCCHs may be mapped to different antennas and transmitted using SORT, or using a single antenna. The PUCCHs may be mapped to different UL carriers or to different subframes. For instance, five DL component carriers D1, D2, D3, D4, D5 may be separated into four groups: [D1], [D2], [D3], [D4, D5] and partial ACK/NACK bundling may be performed in the fourth group [D4, D5], (i.e., ACK/NACKs corresponding to CC4 and CC5 are bundled, and ACK/NACKs corresponding to other CCs are not bundled). This will result in three unbundled ACK/NACKs and one bundled ACK/NACK. A channel selection mechanism may be performed across the four ACK/NACKs. With this scheme, the CM or PAPR may be reduced due to a single PUCCH transmission which results from the channel selection, that is, a single PUCCH resource may be selected and used to transmit HARQ ACK/NACK state.

The grouping of the component carriers or ACK/NACKs may be fixed, semi-static, or dynamic. In fixed grouping, the number of groups and the component carriers or ACK/NACKs that belong to each group may be predetermined. In semi-static grouping, the component carriers or ACK/NACKs that belong to each group may be configurable and may be informed to the WTRU via higher layer signaling, (e.g., radio resource control (RRC) signaling or system information, such as system information blocks (SIBs)). In dynamic grouping, the component carriers or ACK/NACKs that belong to each group may be informed to the WTRU via layer 1 or 2 (L1/2) control signaling, (e.g., PDCCH or medium access control (MAC) control element (CE)). In semi-static or dynamic grouping, component carriers (or ACK/NACKs) may be grouped based on measurement reports, (e.g., either UL or DL measurements or combination of both), such as channel quality indication (CQI) feedback. Alternatively, the eNodeB may decide the grouping based on network or scheduling interest or combination of the measurement and/or network or scheduling interest.

Embodiments for detecting a missing PDCCH while implementing partial ACK/NACK bundling for component carriers is disclosed hereafter. If ACK/NACKs are not bundled (i.e., one HARQ feedback is sent back for each codeword), a missing PDCCH will be detected at the eNodeB. However, since multiple ACK/NACKs are bundled, (i.e., one HARQ feedback is sent back for a plurality of codewords (i.e., multiple PDSCHs)), a missing PDCCH will not be detected at the eNodeB. Therefore, a mechanism to detect the missing PDCCH for multiple component carriers and a corresponding PDSCH is necessary.

In accordance with one embodiment, the eNodeB may signal the number of PDCCHs transmitted for each group of component carriers. The signaling may be dynamically provided to a WTRU. For example, an indicator may be included in a PDCCH for each carrier group. The eNodeB may send PDCCHs with an indicator and possibly a component carrier group indication. For a component carrier group that has K component carriers, the value of indicator may range from 1 to K. A WTRU decodes the PDCCHs and obtain an indicator in one (or more than one) of the decoded PDCCHs. If the number of successfully decoded PDCCHs for a group is not equal to the value of the indicator obtained for that group, the WTRU recognizes that at least one PDCCH is missing in the component carrier group. When ACK/NACK bundling for the component carrier group is performed, the WTRU may generate a bundled NACK if the number of successfully decoded PDCCHs for the component carrier group is not equal to the value of the indicator for that group even if the all decoded PDSCHs result in ACKs. The WTRU also generates a bundled NACK if at least one PDSCH is not successfully decoded regardless of the existence of a missing PDCCH. The WTRU may generate a bundled ACK on a condition that the number of successfully decoded PDCCHs for the component carrier group is equal to the value of the indicator for that group and all the decoded PDSCHs result in ACKs.

In accordance with another embodiment, the WTRU may signal the number of detected PDCCHs when sending a bundled ACK. When an ACK/NACK bundling is performed for a group of component carriers, if all received transport blocks (TBs) are decoded successfully, a bundled ACK is indicated along with the number of detected PDCCHs. The WTRU sends a bundled NACK if at least one TB is not decoded successfully. The WTRU perform discontinuous transmission (DTX) if nothing is detected.

For a component carrier group that has K component carriers, a WTRU may signal the number of detected PDCCHs along with a bundled ACK. If K=1, there is no need to signal the number of detected PDCCHs. The WTRU may signal an ACK/NACK using PUCCH format 1a with BPSK modulation for one codeword as shown in Table 1 (or PUCCH format 1b for two codewords).

TABLE 1

| States | b(0) |
|---|---|
| NACK | 0 |
| ACK | 1 |
| DTX | N/A |

Alternatively, the WTRU may signal bundled ACK/NACKs for two groups simultaneously using PUCCH format 1b with QPSK modulation as shown in Table 2.

TABLE 2

| States (Group1, Group2) | b(0), b(1) |
|---|---|
| NACK/DTX for group 1, NACK/DTX for group2 | 0, 0 |
| NACK/DTX for group 1, ACK for group 2 | 0, 1 |
| ACK for group1, NACK/DTX for group 2 | 1, 0 |
| ACK for both groups 1 and 2 | 1, 1 |
| DTX, DTX | N/A |

If K=2, the WTRU may signal a bundled ACK/NACK along with the number of detected PDCCHs for the component carrier group as shown in any one of Tables 3-5:

TABLE 3

| States | b(0), b(1) |
|---|---|
| NACK | 0, 0 |
| ACK and one PDCCH is detected | 0, 1 |
| ACK and two PDCCHs are detected | 1, 0 |
| Reserved | 1, 1 |
| DTX | N/A |

TABLE 4

| States | b(0), b(1) |
|---|---|
| NACK resulting from at least one component carrier | 0, 0 |
| ACK resulting from one PDCCH corresponding to DL CC1 is detected (ACK, DTX) | 0, 1 |
| ACK resulting from one PDCCH corresponding to DL CC2 is detected (DTX, ACK) | 1, 0 |
| ACK resulting from two PDCCHs corresponding to both DL CC1 and CC2 are detected (ACK, ACK) | 1, 1 |
| DTX, DTX | N/A |

TABLE 5

| States | b(0), b(1) |
|---|---|
| (NACK, NACK) | 0, 0 |
| (ACK, NACK) | |
| (NACK, ACK) | |
| (NACK, DTX) | |
| (DTX, NACK) | |
| (ACK, DTX) | 0, 1 |
| (DTX, ACK) | 1, 0 |
| (ACK, ACK) | 1, 1 |
| DTX, DTX | N/A |

If K=3, the WTRU may signal a bundled ACK/NACK along with the number of detected PDCCHs for the component carrier group as shown in Table 6:

TABLE 6

| States | b(0), b(1) |
|---|---|
| NACK | 0, 0 |
| ACK and one PDCCH is detected | 0, 1 |
| ACK and two PDCCHs are detected | 1, 0 |
| ACK and three PDCCHs are detected | 1, 1 |
| DTX | N/A |

If K=4, the WTRU may signal a bundled ACK/NACK along with the number of detected PDCCHs for the component carrier group as shown in Table 7:

TABLE 7

| States | b(0), b(1) |
| --- | --- |
| NACK | 0, 0 |
| ACK and one or four PDCCH are detected | 0, 1 |
| ACK and two PDCCHs are detected | 1, 0 |
| ACK and three PDCCHs are detected | 1, 1 |
| DTX | N/A |

It should be noted that Tables 1-7 are provided as an example, and different mappings may be used for indicating the number of detected PDCCHs and the bundled ACK/NACK.

A PDCCH transmitted for DL resource allocation implicitly indicates the PUCCH resource for HARQ feedback, (i.e., the PUCCH resource is implicitly indicated by the first control channel element (CCE) address of the PDCCH). Where the ACK/NACK bundling is performed for a component carrier group and a plurality of PDCCHs are transmitted for a plurality of codewords, some of the implicitly indicated PUCCH resources may not be necessary for HARQ feedback because multiple ACK/NACKs are combined into one bundled ACK/NACK.

In accordance with one embodiment, the PUCCH resource may be implicitly indicated by the PDCCH, (e.g., by the first CCE address of the PDCCH), but the WTRU may monitor one of the PDCCHs for determining the PUCCH resource for each group. The PDCCH that the WTRU monitors may be designated based on, for example, component carrier or frequency index order (e.g., smallest or largest), component carrier priority order (e.g., PDCCH corresponding to CC with highest priority is designated), or signaling (either via common or dedicated signaling), or the like.

Alternatively, one PUCCH resource may be explicitly indicated among others for the WTRU ACK/NACK feedback for each group, (e.g., RRC signaling). This may reduce the waste of PUCCH resources for bundled ACK/NACK transmission. The PUCCH resource may be designated for ACK/NACK transmission based on, for example, PUCCH resource index order (e.g., smallest or largest), priority order (e.g., PUCCH with highest priority is designated), or signaling (either via common or dedicated signaling), or the like.

Figure 7:
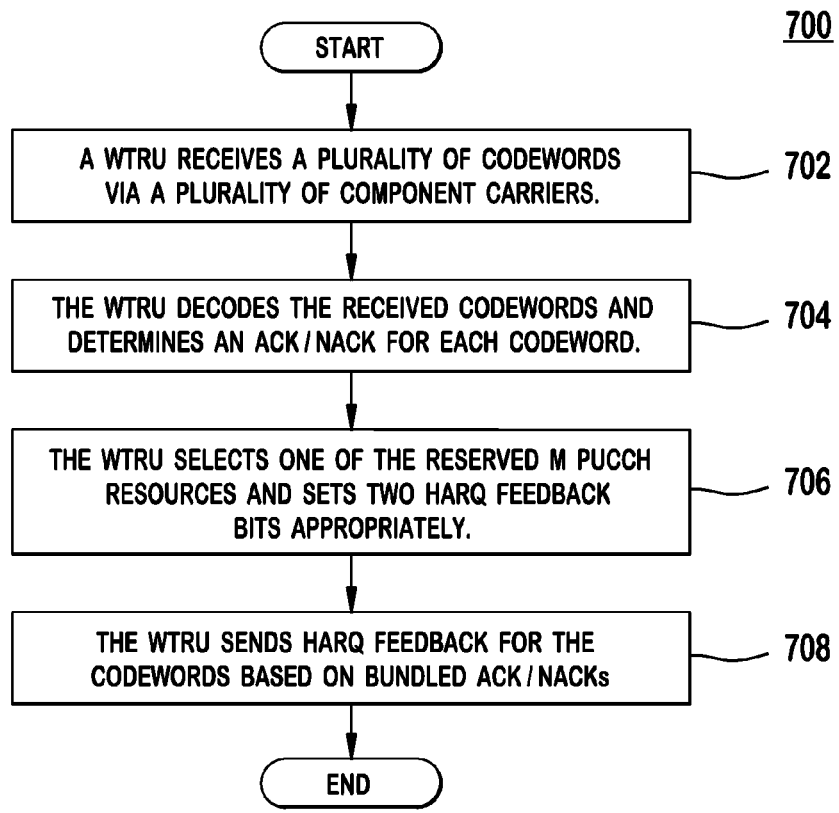
FIG. 7 is a flow diagram of an example process of performing channel selection for indicating ACK/NACKs in accordance with one embodiment.

In accordance with another embodiment, a channel selection mechanism may be used for indicating the ACK/NACKs for multiple DL component carriers or multiple groups of DL component carriers. FIG. 7 is a flow diagram of an example process 700 for performing channel selection for indicating ACK/NACKs in accordance with one embodiment. A WTRU receives a plurality of codewords via a plurality of DL component carriers (step 702). The WTRU decodes the received codewords and determines an ACK/NACK for each codeword (step 704). Multiple PUCCH resources are reserved for the WTRU for transmission of HARQ feedback for the codewords. If there are M ACK/NACKs to be transmitted on the UL, M PUCCH resources are assigned to a WTRU. The WTRU selects one of the assigned M PUCCH resources and sets two HARQ feedback bits appropriately (step 706). The WTRU may use a look-up table to select the PUCCH resource among the assigned PUCCHs and set the bits b(0), b(1) according to the determined ACK/NACKs and discontinuous transmission (DTX) state. The WTRU sends a PUCCH via the selected PUCCH resource (step 708). The two HARQ bits may be carried by PUCCH format 1b.

With M UL resources, which PUCCH resource is selected for transmission indicates M possible states, and the two HARQ bits b(0) and b(1) indicate four possible states. Combination of the PUCCH resource selection and the HARQ bits setting b(0), b(1) may indicate 4M possible states. For example, if there are M=4 DL component carriers and a channel selection is performed across the four DL component carriers, 16 possible states (4×4=16) may be indicated by the combination of the channel selection and the contents of the two bits b(0) and b(1). Each state may indicate one of the combinations of ACK, NACK or DTX of the four DL component carriers. As one of the M PUCCH resources is selected to carry ACK/NACK bits, the other M−1 PUCCH resources remain idle.

FIG. 8 shows an example of channel selection for single antenna transmission in accordance with one embodiment. In FIG. 8, four DL component carriers are configured for a WTRU. The WTRU receives DL transmissions via the DL component carriers. The WTRU decodes the DL transmissions and determines ACK/NACKs, (i.e., A/N(1), A/N(2), A/N(3), A/N(4)), for the DL transmissions. Four PUCCH resources may be assigned to the WTRU for HARQ feedback transmissions in the UL, while the selected PUCCH resource, (not all the PUCCH resources), is used for transmission of HARQ feedback bits. The combination of the PUCCH resource selection and the specific setting of the ACK/NACK bits on the selected PUCCH resource indicates the ACK/NACK status associated with all four DL component carriers.

Alternatively, the DL component carriers may be grouped into multiple groups and the channel selection scheme may be implemented per group. For channel selection for each group, multiple PUCCH resources are assigned for each group, and one of the PUCCH resources for the group is selected and HARQ feedback bits are set based on the HARQ ACK/NACK/DTX status in each group.

FIGS. 9A and 9B show examples of DL component carrier grouping and channel selection for transmission of HARQ feedback for one and two transmit antennas, respectively. In FIG. 9A, eight DL component carriers are configured for the WTRU, and the DL component carriers are grouped into two groups. A WTRU receives codewords via the DL component carriers and determines ACK/NACK status for the codewords. The WTRU performs a channel selection in each group separately such that one of the PUCCH resources assigned for each group is selected and the HARQ feedback bits (two bits $b_0$ and $b_1$) are determined based on the ACK/NACKs in the group, (e.g., using a look-up table). The HARQ feedback bits may be transmitted via the associated PUCCHs, respectively. The two PUCCHs may be transmitted via two different antennas as shown in FIG. 9A. Alternatively, the two PUCCHs may be transmitted via one transmit antenna, as shown in FIG. 9B.

Figure 10:
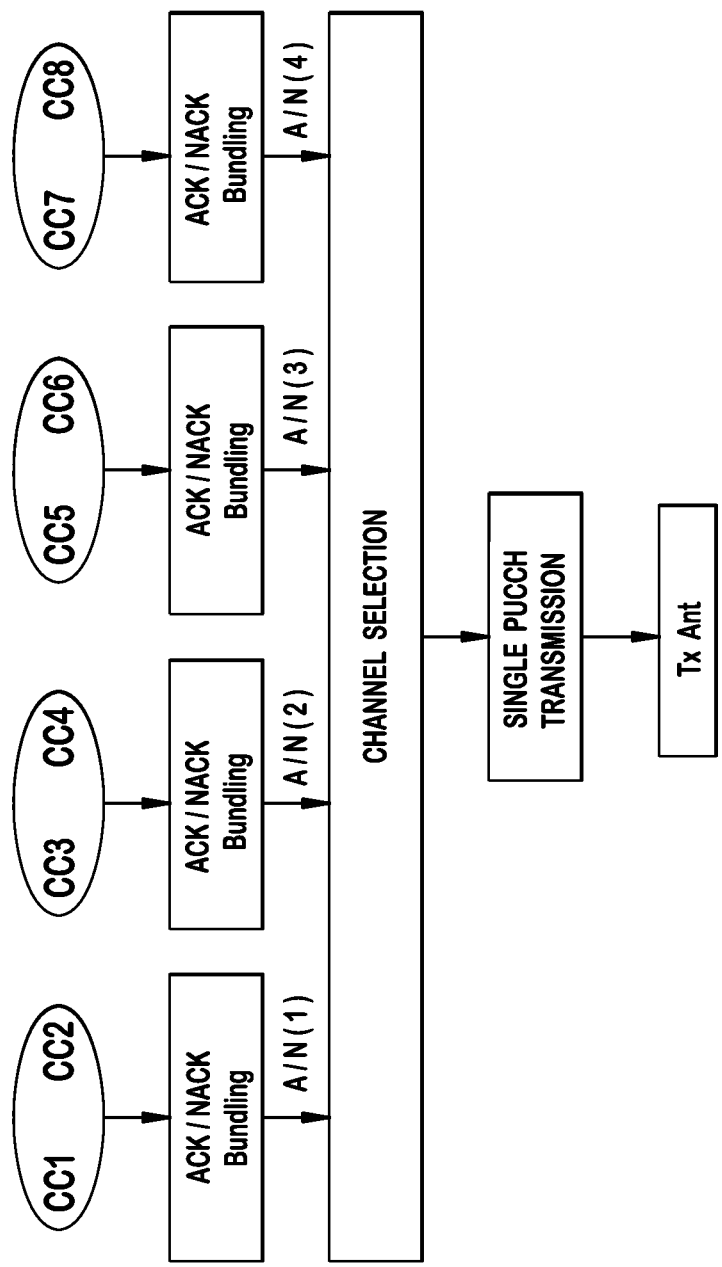
FIG. 10 shows an example of HARQ ACK/NACK bundling and channel selection for single PUCCH transmission.

In accordance with another embodiment, the DL component carriers may be grouped and ACK/NACK bundling may be performed per group, and the channel selection scheme may be performed across the bundled ACK/NACKs. FIG. 10 shows an example of HARQ ACK/NACK bundling and channel selection for single PUCCH transmission. In FIG. 10, eight component carriers are configured for the WTRU. The eight component carriers are separated into four groups as follows: group 1—[CC1 CC2], group 2—[CC3, CC4], group 3—[CC5, CC6] and group 4—[CC7, CC8]. The WTRU receives codewords via the DL component carriers and determines ACK/NACKs for the codewords. The WTRU then performs partial ACK/NACK bundling for each group, (i.e., ACK/NACKs are bundled within each group). This results in one bundled ACK/NACK for each group and therefore four bundled ACK/NACKs are generated for the four groups, denoted as A/N(1), A/N(2), A/N(3) and A/N(4). After ACK/NACK bundling, a channel selection is performed across the bundled ACK/NACKs. The WTRU may use a look-up table to select one PUCCH resource among the reserved PUCCH resources and set the HARQ bits b(0), b(1) according to the bundled ACK/NACKs and discontinuous transmission (DTX) status. The HARQ feedback may be transmitted via the selected PUCCH resource via a transmit antenna.

In accordance with another embodiment, two level grouping may be implemented such that the DL component carriers are separated into multiple groups for ACK/NACK bundling and the bundled ACK/NACKs are further separated into multiple groups for performing channel selection for each group of bundled ACK/NACKs. The two level grouping may be used to support higher DL component carrier aggregation, (e.g., more than eight component carriers), for bandwidth extension, maintaining the CM or PAPR while reducing the PUCCH resource overhead at the same time.

Figure 11:
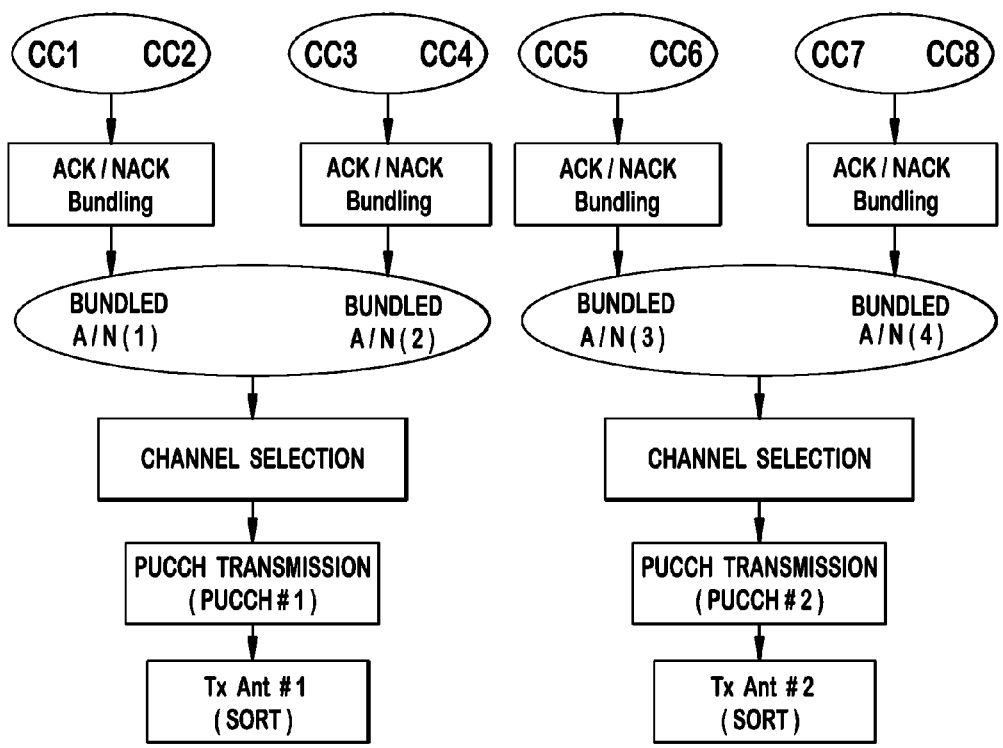
FIG. 11 shows an example two-level grouping, ACK/NACK bundling and channel selection in accordance with one embodiment.

FIG. 11 shows an example two-level grouping, ACK/NACK bundling and channel selection in accordance with one embodiment. In FIG. 11, a WTRU is configured with eight DL component carriers. The eight component carriers are separated into four groups such that CC1 and CC2 are in group 1, CC3 and CC4 are in group 2, CC5 and CC6 are in group 3, and CC7 and CC8 are in group 4. After receiving and decoding codewords on the DL component carriers, the WTRU determines an ACK/NACK for each codeword. The WTRU performs partial ACK/NACK bundling for each group such that the ACK/NACKs are combined within a group. In FIG. 11, four bundled ACK/NACKs are generated and the generated bundled ACK/NACKs, (i.e., DL component carriers), are further grouped into two groups. Channel selection is then performed over the grouped bundled ACK/NACKs. A PUCCH resource is selected and HARQ bits are set based on the status of the bundled ACK/NACKs in each group (e.g., using a look-up table). The PUCCHs may be transmitted via separate antennas, as shown in FIG. 11. Alternatively, the PUCCHs may be transmitted via one transmit antenna.

The WTRU may be informed of, or configured for, a single UL component carrier which the WTRU uses for subsequent PUCCH transmissions. Alternatively, the WTRU may be informed of, or configured for, multiple UL component carriers, with an associated DL/UL component carrier mapping, for subsequent PUCCH transmissions. This indicates which UL component carrier(s) may be used to transmit ACK/NACKs, as well as any other related information, corresponding to which DL component carriers or groups of DL component carriers. Multiple or all DL component carriers may be associated with a single UL component carrier for PUCCH transmissions.

In any embodiments disclosed herein, multiple codewords, (e.g., two codewords), may be transmitted on each DL component carrier, and the ACK/NACKs for the codewords on the single component carrier may be bundled. This will be referred to as "spatial ACK/NACK bundling." ACK/NACKs after spatial bundling may be further bundled across multiple DL component carriers within a group, and/or channel selection may also be performed.

In a case where the number of PDCCHs is less than the number of TBs in the DL transmission, additional PUCCH resource may be required to perform the channel selection. For example, if each PDCCH indicates 2 TBs and two PDCCHs are transmitted to the WTRU, (i.e., 2 PDCCHs in a group indicate 4 TBs), there will be 16 possible states for ACK/NACK/DTX for the two PDCCHs. This requires four PUCCH resources for performing the channel selection mechanism for HARQ feedback. In accordance with one embodiment, to assign four PUCCH resources by the two PDCCHs, for example, the second CCE address of each PDCCH or the second half CCE address of each PDCCH may be used to implicitly indicate the additional PUCCH resource. Alternatively, a certain offset, (e.g., x CCEs), may be applied to the first CCE address of each PDCCH to implicitly indicate the additional PUCCH resource. The offset may be signaled to the WTRU either semi-statically or dynamically.

In any of the embodiments disclosed above, the PUCCHs may be transmitted via a single antenna or multiple antennas. In a case where a WTRU has multiple antennas, each PUCCH may be mapped to a particular transmit antenna. In a case where the number of PUCCHs is greater than the number of antennas, more than one PUCCH may be mapped to a particular one of the antennas.

Figure 12:
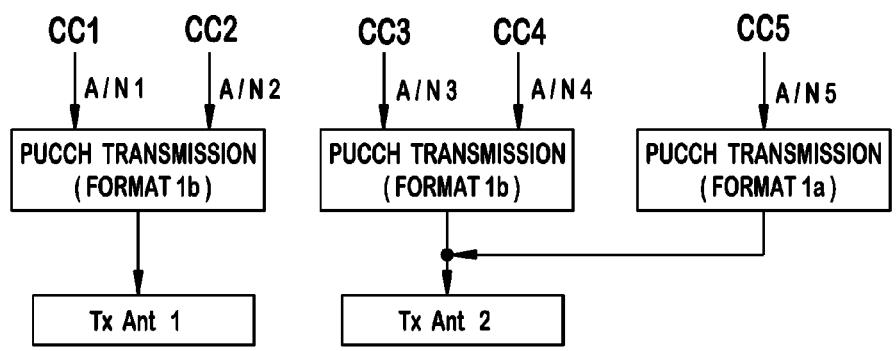
FIG. 12 shows an example of multiple PUCCH transmissions via two transmit antennas.

FIG. 12 shows an example of multiple PUCCH transmissions via two transmit antennas. In FIG. 12, a WTRU is configured with five DL component carriers and the component carriers are separated into three groups: CC1 and CC2 in a first group, CC3 and CC4 in a second group, and CC5 in a third group. The ACK/NACKs in the first group may be transmitted on a first PUCCH using PUCCH format 1b, and the ACK/NACKs in the second group may be transmitted on a second PUCCH using PUCCH format 1b, and ACK/NACK in the third group may be transmitted on a third PUCCH using PUCCH format 1a. The first PUCCH may be transmitted via a first antenna, and the second PUCCH and the third PUCCH may be transmitted via a second antenna. The number of DL component carriers in each group may be any number, and spatial ACK/NACK bundling, and/or ACK/NACK bundling across multiple DL component carriers, and/or a channel selection scheme may also be performed.

In accordance with another embodiment, a WTRU may send ACK/NACK bits (optionally coded bits) or ACK/NACK/DTX state bits (optionally coded bits) implicitly or explicitly, for example, by modulating the demodulation reference signal (DMRS) using BPSK or QPSK, by selecting the PUCCH channels or resources for ACK/NACK data transmission, by selecting the PUCCH channels or resources for DMRS transmission, by selecting the slots/channels for ACK/NACK data transmission and/or DMRS transmission, and/or by modulating control channel data using 8 phase shift keying (8PSK) or the equivalent or higher order modulation, or any combination of these.

The PUCCH carries ACK/NACK data and a DMRS. By modulating the PUCCH DMRS using BPSK or QPSK, (e.g., by changing the phase of the PUCCH DMRS in at least one of the DMRSs in a slot, or by changing the phase of the PUCCH DMRS in one of the two slots in a subframe), the WTRU may send 1 or 2 more bits, respectively, in addition to the ACK/NACK bits that are sent in the data part of the control channel, (i.e., PUCCH).

Alternatively or additionally, in a case where two or more PUCCH resources are allocated to the WTRU, by selecting the PUCCH channels or resources for ACK/NACK transmission, the WTRU may send $\lfloor \log_2 L \rfloor$ more bits by selecting one among L PUCCH channels or resources for ACK/NACK transmission. $\lfloor x \rfloor$ is a floor function, which provides a largest integer same to or smaller than x. For example, when a WTRU is assigned with four PUCCH resources, the WTRU may send 2 more bits by selecting one of the four PUCCH channels or resources for ACK/NACK transmission. Similarly, when the WTRU has multiple PUCCH resources assigned, the WTRU may send $\lfloor \log_2 Q \rfloor$ bits more by selecting one among Q PUCCH channels or resources for DMRS transmission. For example, when a WTRU has four PUCCH resources, the WTRU may send 2 more bits by selecting one of the four PUCCH channels or resources for DMRS transmission.

Alternatively or additionally, the WTRU may send more bits by transmitting ACK/NACK data in different slots of PUCCH channels. According to current LTE specification, there are two slots in a subframe per PUCCH channel. With the combination of slots and PUCCH channels, the WTRU may indicate more bits. For example, for if 2 PUCCH channels are allocated for the WTRU, four combinations of slots and PUCCH channels for ACK/NACK transmission may be made as shown in Table 8. "X" in Table 8 indicates that signal or data is transmitted on that slot of that channel. Table 8 shows four combinations of PUCCH channel and slot for avoiding transmitting the signal or data in the same slot on two channels, but it is also possible to have up to six combinations if transmission of the data in the same slots of two channels is allowable. It should be noted that the combinations in Table 8 is an example and different combinations are possible.

TABLE 8

| Location Index | Channel 1 Slot#0 | Channel 1 Slot#1 | Channel 2 Slot#0 | Channel 2 Slot#1 |
|---|---|---|---|---|
| 0 | X | X | | |
| 1 | X | | | X |
| 2 | | | X | X |
| 3 | | X | X | |

For example, the WTRU may carry four bits by sending data using QPSK in a different location index, (i.e., a different slot and a different channel), as shown in Table 9, as an example. For example, the WTRU may indicate '0111' for ACK/NACK by transmitting data=01 using a location index 0, (i.e., channel 1/slot 0 and channel 2/slot 1). The WTRU may indicate '1001' for ACK/NACK by transmitting data=11 using a location index 3, (i.e., channel 1/slot 1 and channel 2/slot 0), and so on.

TABLE 9

| b0 | b1 | b2 | b3 | DATA (QPSK) | Location index |
|---|---|---|---|---|---|
| | (state) | | | | |
| 0 | 0 | 0 | 0 | 0 0 | 0 |
| 0 | 0 | 0 | 1 | 0 1 | 0 |
| 0 | 0 | 1 | 1 | 1 1 | 0 |
| 0 | 0 | 1 | 0 | 1 0 | 0 |
| 0 | 1 | 1 | 0 | 0 0 | 1 |
| 0 | 1 | 1 | 1 | 0 1 | 1 |
| 0 | 1 | 0 | 1 | 1 1 | 1 |
| 0 | 1 | 0 | 0 | 1 0 | 1 |
| 1 | 1 | 0 | 0 | 0 0 | 2 |
| 1 | 1 | 0 | 1 | 0 1 | 2 |
| 1 | 1 | 1 | 1 | 1 1 | 2 |
| 1 | 1 | 1 | 0 | 1 0 | 2 |
| 1 | 0 | 1 | 0 | 0 0 | 3 |
| 1 | 0 | 1 | 1 | 0 1 | 3 |
| 1 | 0 | 0 | 1 | 1 1 | 3 |
| 1 | 0 | 0 | 0 | 1 0 | 3 |

Alternatively or additionally, the WTRU may send more bits, (e.g., additional 2 more bits), by transmitting a DMRS in different slots of the PUCCH channels using the location index same or similar to Table 8. The location index may be used separately and independently for the ACK/NACK data and the DMRS to indicate additional bits, (e.g., 4 more bits additionally). It is preferred but not limited to assign PUCCH channels to the WTRU in the same RB for using location index for DMRS transmission. If channel responses are flat or non-frequency selective for RBs, PUCCH channels may be assigned to the WTRU in different RBs for using location index for DMRS transmission. An example of indicating 5 bits is provided in Table 10 by combining QPSK modulation of PUCCH data and channel and slot selection for the PUCCH data and DMRS. It should be noted that Table 10 shows indication of five bits for simplicity and six bits, (or more if transmission of data or DMRS on the same slot of two channels is used), may be indicated by the QPSK modulation of the PUCCH data, and channel and slot selection for the PUCCH data and/or DMRS. It should be noted that the combinations in Table 10 is an example and different combinations are possible.

TABLE 10

| b0 | b1 | b2 (state) | b3 | b4 | DATA (QPSK) | Location index for ACK/NACK data transmission | Location index for DMRS transmission |
|---|---|---|---|---|---|---|---|
| 0 | 0 | 0 | 0 | 0 | 0 0 | 0 | 0 |
| 0 | 0 | 0 | 0 | 1 | 0 1 | 0 | 0 |
| 0 | 0 | 0 | 1 | 1 | 1 1 | 0 | 0 |
| 0 | 0 | 0 | 1 | 0 | 1 0 | 0 | 0 |
| 0 | 0 | 1 | 1 | 0 | 0 0 | 1 | 0 |
| 0 | 0 | 1 | 1 | 1 | 0 1 | 1 | 0 |
| 0 | 0 | 1 | 0 | 1 | 1 1 | 1 | 0 |
| 0 | 0 | 1 | 0 | 0 | 1 0 | 1 | 0 |
| 0 | 1 | 1 | 0 | 0 | 0 0 | 2 | 0 |
| 0 | 1 | 1 | 0 | 1 | 0 1 | 2 | 0 |
| 0 | 1 | 1 | 1 | 1 | 1 1 | 2 | 0 |
| 0 | 1 | 1 | 1 | 0 | 1 0 | 2 | 0 |
| 0 | 1 | 0 | 1 | 0 | 0 0 | 3 | 0 |
| 0 | 1 | 0 | 1 | 1 | 0 1 | 3 | 0 |
| 0 | 1 | 0 | 0 | 1 | 1 1 | 3 | 0 |
| 0 | 1 | 0 | 0 | 0 | 1 0 | 3 | 0 |
| 1 | 1 | 0 | 0 | 0 | 0 0 | 0 | 2 |
| 1 | 1 | 0 | 0 | 1 | 0 1 | 0 | 2 |
| 1 | 1 | 0 | 1 | 1 | 1 1 | 0 | 2 |
| 1 | 1 | 0 | 1 | 0 | 1 0 | 0 | 2 |
| 1 | 1 | 1 | 1 | 0 | 0 0 | 1 | 2 |
| 1 | 1 | 1 | 1 | 1 | 0 1 | 1 | 2 |
| 1 | 1 | 1 | 0 | 1 | 1 1 | 1 | 2 |
| 1 | 1 | 1 | 0 | 0 | 1 0 | 1 | 2 |
| 1 | 0 | 1 | 0 | 0 | 0 0 | 2 | 2 |
| 1 | 0 | 1 | 0 | 1 | 0 1 | 2 | 2 |
| 1 | 0 | 1 | 1 | 1 | 1 1 | 2 | 2 |
| 1 | 0 | 1 | 1 | 0 | 1 0 | 2 | 2 |
| 1 | 0 | 0 | 1 | 0 | 0 0 | 3 | 2 |
| 1 | 0 | 0 | 1 | 1 | 0 1 | 3 | 2 |
| 1 | 0 | 0 | 0 | 1 | 1 1 | 3 | 2 |
| 1 | 0 | 0 | 0 | 0 | 1 0 | 3 | 2 |

Figures 13A, 13B:
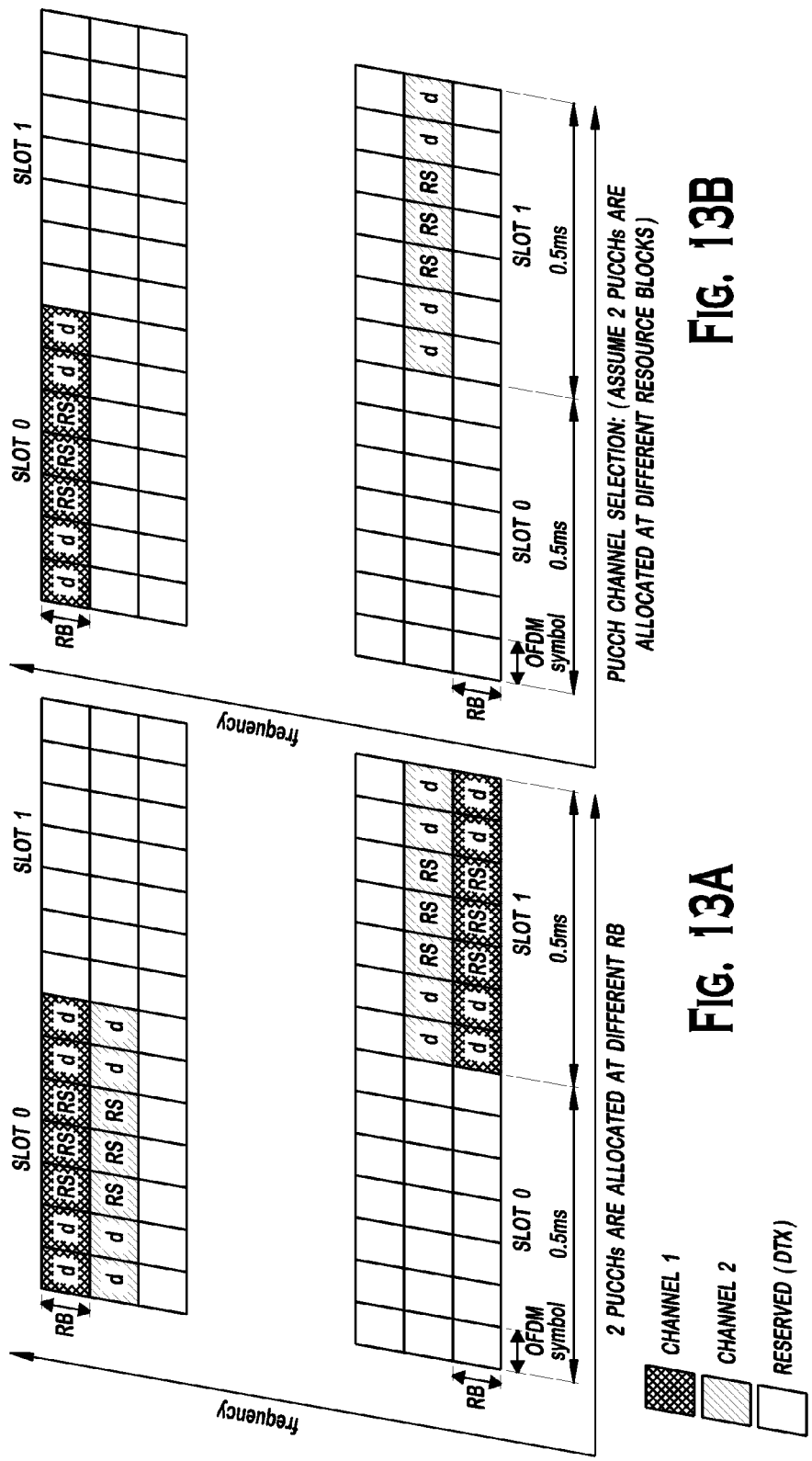
FIGS. 13(A) and 13(B) show an example transmission of ACK/NACK data and DMRS using channel and slot selection in accordance with the embodiment above.

FIGS. 13(A) and 13(B) show an example transmission of ACK/NACK data and DMRS using channel and slot selection in accordance with the embodiment above. FIG. 13(A) shows two PUCCH channels reserved for a WTRU, as an example, in different resource blocks. The PUCCH channels may be reserved in the same resource block. FIG. 13(B) shows actual transmission of PUCCH data and DMRS. In this example, PUCCH channel 1/slot 0 and channel 2/slot 1 are used for transmitting the ACK/NACK data and DMRS. Other combinations of PUCCH channels and slots for transmitting ACK/NACK data and DMRS are also possible, and the ACK/NACK data and the DMRS may be transmitted on different PUCCH channels and slots independently. Although FIGS. 13(A) and 13(B) show PUCCH channel using format 1a or 1b for illustration purpose, the embodiments may be applied to any type of PUCCH channel including PUCCH format 2 (or 2a, 2b), DFT-S-OFDM based format, or other new formats. The embodiments may also be applied to physical uplink shared channel (PUSCH) as well.

Alternatively or additionally, the WTRU may send 1 more bit by modulating ACK/NACK data using 8PSK or equivalent modulation scheme instead of modulating the ACK/NACK data using QPSK.

The WTRU may send more ACK/NACK bits or ACK/NACK/DTX state bits by using combination of DMRS modulation, channel selection for ACK/NACK data transmission, channel selection for DMRS transmission, and ACK/NACK data modulation using 8PSK or other equivalent or higher order modulation schemes in addition to the ACK/NACK bits which are sent in data part of control channel, such as PUCCH.

In accordance with one embodiment, for example, the DMRS may be modulated using BPSK by [u0, u1], (i.e., the phase of the DMRS is change between two), within a time slot or across the time slots where, for example, [u0, u1]=[+1, +1] or [+1, −1] such that u0 and u1 are modulated with two different DMRSs or DMRS groups, e.g., u0 and u1 are modulated with the first and second DMRS or DMRS groups respectively within a timeslot, or u0 and u1 are modulated with the DMRSs in the first and second slot of a subframe, respectively. Similarly the DMRS may also be modulated using BPSK or QPSK by [u0, u1] within the same time slot, (e.g., for PUCCH format 2 or 2x). Table 11 shows an example case of sending three (3) ACK/NACK bits via a PUCCH using format 1b, format 2 or DFT-S-OFDM based format. By setting two QPSK bits on the data part of the PUCCH format 1b and modulating the two DMRS signals either in the same timeslot or across two slots in a subframe (e.g., hopping is not used) as shown in Table 11, total three bits of ACK/NACK information may be sent.

TABLE 11

| Indicated bits | | | Transmitted bit | |
|---|---|---|---|---|
| b0 | b1 (state) | b2 | a0, a1 (QPSK) | [u0, u1] (BPSK) |
| 0 | 0 | 0 | 0 0 | [1, 1] |
| 0 | 0 | 1 | 0 0 | [1, −1] |
| 0 | 1 | 1 | 0 1 | [1, 1] |
| 0 | 1 | 0 | 0 1 | [1, −1] |
| 1 | 1 | 0 | 1 0 | [1, 1] |
| 1 | 1 | 1 | 1 0 | [1, −1] |
| 1 | 0 | 1 | 1 1 | [1, 1] |
| 1 | 0 | 0 | 1 1 | [1, −1] |

Example indicated bits for representing ACK/NACK/DTX states for two component carriers is shown in the Table 12.

TABLE 12

| Indicated bits | | | ACK/NACK/DTX |
|---|---|---|---|
| b0 | b1 | b2 | state |
| 0 | 0 | 0 | ACK ACK |
| 0 | 0 | 1 | ACK NACK |
| 0 | 1 | 1 | NACK ACK |
| 0 | 1 | 0 | NACK NACK |
| 1 | 1 | 0 | ACK DTX |
| 1 | 1 | 1 | NACK DTX |
| 1 | 0 | 1 | DTX ACK |
| 1 | 0 | 0 | DTX NACK |

Alternatively, the 3 bits of ACK/NACK information may be sent by using 8PSK or equivalent or higher modulation scheme on data part of the PUCCH. Table 13 shows an example multiplexing method using single PUCCH with 8PSK. In Table 13, PUCCH data is modulated using 8PSK to carry three bits of ACK/NACK information. Alternatively, other equivalent or higher order phase-shift keying modulation scheme may be used. The WTRU multiplexing gain is 18 WTRUs per physical resource block (PRB).

TABLE 13

| b0 | b1 (state) | b2 | DATA (8-PSK) |
|---|---|---|---|
| 0 | 0 | 0 | 1 |
| 0 | 0 | 1 | 0.7071 − 0.7071j |
| 0 | 1 | 1 | −j |
| 0 | 1 | 0 | −0.7071 − 0.7071j |
| 1 | 1 | 0 | −1 |
| 1 | 1 | 1 | −0.7071 + 0.7071j |
| 1 | 0 | 1 | j |
| 1 | 0 | 0 | 0.7071 + 0.7071j |

Table 14 shows an example multiplexing scheme using a single PUCCH in accordance with the above embodiment. The two bits representing HARQ ACK/NACK/DTX state are transmitted using PUCCH format 1b, format 2 or DFT-S-OFDM based format with QPSK modulation and the DMRS is modulated with BPSK modulation to indicate total of 8 states (or equivalently 3 bits). The WTRU multiplexing gain is 18 WTRUs per PRB. The DMRS may be modulated with QPSK modulation to indicate 16 states (or 4 bits).

TABLE 14

| b0 | b1 (state) | b2 | DATA (QPSK) | First DMRSs | Second DMRSs |
|---|---|---|---|---|---|
| 0 | 0 | 0 | 1 | 1 | 1 |
| 0 | 0 | 1 | 1 | 1 | −1 |
| 0 | 1 | 1 | −j | 1 | −1 |
| 0 | 1 | 0 | −j | 1 | 1 |
| 1 | 1 | 0 | −1 | 1 | 1 |
| 1 | 1 | 1 | −1 | 1 | −1 |
| 1 | 0 | 1 | j | 1 | −1 |
| 1 | 0 | 0 | j | 1 | 1 |

For 4 bits of ACK/NACK information multiplexing, in addition to the QPSK modulation of the PUCCH data part, one PUCCH channel may be selected among two PUCCH channels for PUCCH data and/or DMRS, and/or DMRS may be modulated by BPSK. 8PSK or higher order modulation may also be used for the PUCCH data part. The WTRU multiplexing gain is 9 WTRUs per PRB. Examples are shown in Tables 15 and 16. It should be noted that other variances are also possible.

A WTRU is allocated with two PUCCH resources (channel #1 and #2), and, for 4 bits of ACK/NACK information, the WTRU uses QPSK on the PUCCH data part (i.e., 4 states) and selects a channel between the two allocated channels (2 states) and modulates the DMRS in a slot (e.g., format 2 or DFT-S-OFDM based format) or across the slots in a subframe (2 states), so total of 4×2×2=16 states may be indicated. The WTRU multiplexing gain is equal to 9 WTRUs per PRB.

Table 16 shows another example for 4 bits of ACK/NACK multiplexing. In this example, the PUCCH uses 8PSK and the PUCCH channel is selected between two allocated channels for data and DMRS transmission to indicate one of 16 states (8×2=16). The WTRU multiplexing gain is equal to 9 WTRUs per PRB.

TABLE 15

| b0 | b1 (state) | b2 | b3 | DATA (QPSK) channel #1 | DATA (QPSK) channel #2 | 1st DMRSs channel #1 | 2nd DMRSs channel #1 | 1st DMRSs channel #2 | 2nd DMRSs channel #2 |
|---|---|---|---|---|---|---|---|---|---|
| 0 | 0 | 0 | 0 | 1 | 0 | 1 | 1 | 0 | 0 |
| 0 | 0 | 0 | 1 | 1 | 0 | 1 | −1 | 0 | 0 |
| 0 | 0 | 1 | 1 | −j | 0 | 1 | −1 | 0 | 0 |
| 0 | 0 | 1 | 0 | −j | 0 | 1 | 1 | 0 | 0 |
| 0 | 1 | 1 | 0 | −1 | 0 | 1 | 1 | 0 | 0 |
| 0 | 1 | 1 | 1 | −1 | 0 | 1 | −1 | 0 | 0 |
| 0 | 1 | 0 | 1 | j | 0 | 1 | −1 | 0 | 0 |
| 0 | 1 | 0 | 0 | j | 0 | 1 | 1 | 0 | 0 |
| 1 | 1 | 0 | 0 | 0 | 1 | 0 | 0 | 1 | 1 |
| 1 | 1 | 0 | 1 | 0 | 1 | 0 | 0 | 1 | −1 |
| 1 | 1 | 1 | 1 | 0 | −j | 0 | 0 | 1 | −1 |
| 1 | 1 | 1 | 0 | 0 | −j | 0 | 0 | 1 | 1 |
| 1 | 0 | 1 | 0 | 0 | −1 | 0 | 0 | 1 | 1 |
| 1 | 0 | 1 | 1 | 0 | −1 | 0 | 0 | 1 | −1 |
| 1 | 0 | 0 | 1 | 0 | j | 0 | 0 | 1 | −1 |
| 1 | 0 | 0 | 0 | 0 | j | 0 | 0 | 1 | 1 |

TABLE 16

| b0 | b1 (state) | b2 | b3 | DATA (8PSK) channel #1 | DATA (8PSK) channel #2 | DMRS channel #1 | DMRS channel #2 |
|---|---|---|---|---|---|---|---|
| 0 | 0 | 0 | 0 | 1 | 0 | 1 | 0 |
| 0 | 0 | 0 | 1 | 0.7071 − 0.7071j | 0 | 1 | 0 |
| 0 | 0 | 1 | 1 | −j | 0 | 1 | 0 |
| 0 | 0 | 1 | 0 | −0.7071 − 0.7071j | 0 | 1 | 0 |
| 0 | 1 | 1 | 0 | −1 | 0 | 1 | 0 |
| 0 | 1 | 1 | 1 | −0.7071 + 0.7071j | 0 | 1 | 0 |
| 0 | 1 | 0 | 1 | j | 0 | 1 | 0 |
| 0 | 1 | 0 | 0 | 0.7071 + 0.7071j | 0 | 1 | 0 |
| 1 | 1 | 0 | 0 | 0 | 1 | 0 | 1 |
| 1 | 1 | 0 | 1 | 0 | 0.7071 − 0.7071j | 0 | 1 |
| 1 | 1 | 1 | 1 | 0 | −j | 0 | 1 |
| 1 | 1 | 1 | 0 | 0 | −0.7071 − 0.7071j | 0 | 1 |
| 1 | 0 | 1 | 0 | 0 | −1 | 0 | 1 |
| 1 | 0 | 1 | 1 | 0 | −0.7071 + 0.7071j | 0 | 1 |
| 1 | 0 | 0 | 1 | 0 | j | 0 | 1 |
| 1 | 0 | 0 | 0 | 0 | 0.7071 + 0.7071j | 0 | 1 |

For 5 bits ACK/NACK multiplexing, any combination of the above schemes may be used. Tables 17 and 18 show examples. In Table 17, a PUCCH uses 8PSK, and a channel selection for PUCCH data and DMRS is performed over two allocated channels, and DMRS may be modulated by BPSK within the same slot or across two slots of the subframe to indicate one of 32 states (i.e., 8×2×2=32). The WTRU multiplexing gain is equal to 9 WTRUs per PRB.

TABLE 17

| b0 | b1 (state) | b2 | b3 | b4 | DATA (8-PSK) channel #1 | DATA (8-PSK) channel #2 | 1st DMRSs channel #1 | 2nd DMRSs channel #1 | 1st DMRSs channel #2 | 2nd DMRSs channel #2 |
|---|---|---|---|---|---|---|---|---|---|---|
| 0 | 0 | 0 | 0 | 0 | 1 | 0 | 1 | 1 | 0 | 0 |
| 0 | 0 | 0 | 0 | 1 | 0.7071 − 0.7071j | 0 | 1 | −1 | 0 | 0 |
| 0 | 0 | 0 | 1 | 1 | −j | 0 | 1 | 1 | 0 | 0 |
| 0 | 0 | 0 | 1 | 0 | −0.7071 − 0.7071j | 0 | 1 | −1 | 0 | 0 |
| 0 | 0 | 1 | 1 | 0 | −1 | 0 | 1 | 1 | 0 | 0 |
| 0 | 0 | 1 | 1 | 1 | −0.7071 + 0.7071j | 0 | 1 | −1 | 0 | 0 |
| 0 | 0 | 1 | 0 | 1 | j | 0 | 1 | 1 | 0 | 0 |
| 0 | 0 | 1 | 0 | 0 | 0.7071 + 0.7071j | 0 | 1 | −1 | 0 | 0 |
| 0 | 1 | 1 | 0 | 0 | 1 | 0 | 1 | −1 | 0 | 0 |
| 0 | 1 | 1 | 0 | 1 | 0.7071 − 0.7071j | 0 | 1 | 1 | 0 | 0 |
| 0 | 1 | 1 | 1 | 1 | −j | 0 | 1 | −1 | 0 | 0 |
| 0 | 1 | 1 | 1 | 0 | −0.7071 − 0.7071j | 0 | 1 | 1 | 0 | 0 |
| 0 | 1 | 0 | 1 | 0 | −1 | 0 | 1 | −1 | 0 | 0 |
| 0 | 1 | 0 | 1 | 1 | −0.7071 + 0.7071j | 0 | 1 | 1 | 0 | 0 |
| 0 | 1 | 0 | 0 | 1 | j | 0 | 1 | −1 | 0 | 0 |
| 0 | 1 | 0 | 0 | 0 | 0.7071 + 0.7071j | 0 | 1 | 1 | 0 | 0 |
| 1 | 1 | 0 | 0 | 0 | 0 | 1 | 0 | 0 | 1 | 1 |
| 1 | 1 | 0 | 0 | 1 | 0 | 0.7071 − 0.7071j | 0 | 0 | 1 | −1 |
| 1 | 1 | 0 | 1 | 1 | 0 | −j | 0 | 0 | 1 | 1 |

TABLE 17-continued

| b0 | b1 | b2 | b3 | b4 | DATA (8-PSK) channel #1 | DATA (8-PSK) channel #2 | $1^{st}$ DMRSs channel #1 | $2^{nd}$ DMRSs channel #1 | $1^{st}$ DMRSs channel #2 | $2^{nd}$ DMRSs channel #2 |
|---|---|---|---|---|---|---|---|---|---|---|
| 1 | 1 | 0 | 1 | 0 | 0 | −0.7071 − 0.7071j | 0 | 0 | 1 | −1 |
| 1 | 1 | 1 | 1 | 0 | 0 | −1 | 0 | 0 | 1 | 1 |
| 1 | 1 | 1 | 1 | 1 | 0 | −0.7071 + 0.7071j | 0 | 0 | 1 | −1 |
| 1 | 1 | 1 | 0 | 1 | 0 | j | 0 | 0 | 1 | 1 |
| 1 | 1 | 1 | 0 | 0 | 0 | 0.7071 + 0.7071j | 0 | 0 | 1 | −1 |
| 1 | 0 | 1 | 0 | 0 | 0 | 1 | 0 | 0 | 1 | −1 |
| 1 | 0 | 1 | 0 | 1 | 0 | 0.7071 − 0.7071j | 0 | 0 | 1 | 1 |
| 1 | 0 | 1 | 1 | 1 | 0 | −j | 0 | 0 | 1 | −1 |
| 1 | 0 | 1 | 1 | 0 | 0 | −0.7071 − 0.7071j | 0 | 0 | 1 | 1 |
| 1 | 0 | 0 | 1 | 0 | 0 | −1 | 0 | 0 | 1 | −1 |
| 1 | 0 | 0 | 1 | 1 | 0 | −0.7071 + 0.7071j | 0 | 0 | 1 | 1 |
| 1 | 0 | 0 | 0 | 1 | 0 | j | 0 | 0 | 1 | −1 |
| 1 | 0 | 0 | 0 | 0 | 0 | 0.7071 + 0.7071j | 0 | 0 | 1 | 1 |

Table 18 shows another example. In Table 18, a PUCCH uses 8PSK, and a channel is selected for both PUCCH data and DMRS, (i.e., the PUCCH data and DMRS are not necessarily transmitted via the same channel), to indicate one of 32 states (8×4=32). The WTRU multiplexing gain is equal to 9 WTRUs per PRB.

TABLE 18

| b0 | b1 | b2 | b3 | b4 | DATA (8-PSK) channel #1 | DATA (8-PSK) channel #2 | DMRS channel #1 | DMRS channel #2 |
|---|---|---|---|---|---|---|---|---|
| 0 | 0 | 0 | 0 | 0 | 1 | 0 | 1 | 0 |
| 0 | 0 | 0 | 0 | 1 | 0.7071 − 0.7071j | 0 | 1 | 0 |
| 0 | 0 | 0 | 1 | 1 | −j | 0 | 1 | 0 |
| 0 | 0 | 0 | 1 | 0 | −0.7071 − 0.7071j | 0 | 1 | 0 |
| 0 | 0 | 1 | 1 | 0 | −1 | 0 | 1 | 0 |
| 0 | 0 | 1 | 1 | 1 | −0.7071 + 0.7071j | 0 | 1 | 0 |
| 0 | 0 | 1 | 0 | 1 | j | 0 | 1 | 0 |
| 0 | 0 | 1 | 0 | 0 | 0.7071 + 0.7071j | 0 | 1 | 0 |
| 0 | 1 | 1 | 0 | 0 | 0 | 1 | 1 | 0 |
| 0 | 1 | 1 | 0 | 1 | 0 | 0.7071 − 0.7071j | 1 | 0 |
| 0 | 1 | 1 | 1 | 1 | 0 | −j | 1 | 0 |
| 0 | 1 | 1 | 1 | 0 | 0 | −0.7071 − 0.7071j | 1 | 0 |
| 0 | 1 | 0 | 1 | 0 | 0 | −1 | 1 | 0 |
| 0 | 1 | 0 | 1 | 1 | 0 | −0.7071 + 0.7071j | 1 | 0 |
| 0 | 1 | 0 | 0 | 1 | 0 | j | 1 | 0 |
| 0 | 1 | 0 | 0 | 0 | 0 | 0.7071 + 0.7071j | 1 | 0 |
| 1 | 1 | 0 | 0 | 0 | 1 | 0 | 0 | 1 |
| 1 | 1 | 0 | 0 | 1 | 0.7071 − 0.7071j | 0 | 0 | 1 |
| 1 | 1 | 0 | 1 | 1 | −j | 0 | 0 | 1 |
| 1 | 1 | 0 | 1 | 0 | −0.7071 − 0.7071j | 0 | 0 | 1 |
| 1 | 1 | 1 | 1 | 0 | −1 | 0 | 0 | 1 |
| 1 | 1 | 1 | 1 | 1 | −0.7071 + 0.7071j | 0 | 0 | 1 |
| 1 | 1 | 1 | 0 | 1 | j | 0 | 0 | 1 |
| 1 | 1 | 1 | 0 | 0 | 0.7071 + 0.7071j | 0 | 0 | 1 |
| 1 | 0 | 1 | 0 | 0 | 0 | 1 | 0 | 1 |
| 1 | 0 | 1 | 0 | 1 | 0 | 0.7071 − 0.7071j | 0 | 1 |
| 1 | 0 | 1 | 1 | 1 | 0 | −j | 0 | 1 |
| 1 | 0 | 1 | 1 | 0 | 0 | −0.7071 − 0.7071j | 0 | 1 |
| 1 | 0 | 0 | 1 | 0 | 0 | −1 | 0 | 1 |
| 1 | 0 | 0 | 1 | 1 | 0 | −0.7071 + 0.7071j | 0 | 1 |
| 1 | 0 | 0 | 0 | 1 | 0 | j | 0 | 1 |
| 1 | 0 | 0 | 0 | 0 | 0 | 0.7071 + 0.7071i | 0 | 1 |

A reduced spreading factor (SF) for the data part of the PUCCH format 1a/1b, a reduced SF in frequency or time domain for the data part of the PUCCH DFT-S-OFDM based format, or PUCCH format 2 may be used in combination with any of the embodiments above in order to increase the number of bits that may be transmitted by the WTRU. For example, a frequency domain SF=6 for data may be used with DMRS modulation. The PUCCH ACK/NACK data is spread by a frequency-domain orthogonal code of SF=6, (e.g., cyclic shift code), and the DMRS modulation patterns [u0, u1] within a time slot may be used, (e.g., for PUCCH format 2), such that the first and second DMRSs are modulated by u0 and u1, respectively (or DMRSs in the first timeslot and the DMRSs in the second timeslot are modulated by u0 and u1, respectively if hopping is not used). Table 19 shows an example of indicating five bits for ACK/NACK or five coded bits for ACK/NACK/DTX state using SF=6 for data and DMRS modulation.

TABLE 19

| b0 | b1 | b2 | b3 | b4 (state or coded bits for state) | | | | DATA | | | $1^{st}$ DMRSs | $2^{nd}$ DMRSs |
|---|---|---|---|---|---|---|---|---|---|---|---|---|
| 0 | 0 | 0 | 0 | 0 | 0 | 0 | 0 | 0 | | | 1 | 1 |
| 0 | 0 | 0 | 0 | 1 | 0 | 0 | 0 | 1 | | | 1 | 1 |
| 0 | 0 | 0 | 1 | 1 | 0 | 0 | 1 | 1 | | | 1 | 1 |
| 0 | 0 | 0 | 1 | 0 | 0 | 0 | 1 | 0 | | | 1 | 1 |
| 0 | 0 | 1 | 1 | 0 | 0 | 1 | 1 | 0 | | | 1 | 1 |
| 0 | 0 | 1 | 1 | 1 | 0 | 1 | 1 | 1 | | | 1 | 1 |
| 0 | 0 | 1 | 0 | 1 | 0 | 1 | 0 | 1 | | | 1 | 1 |
| 0 | 0 | 1 | 0 | 0 | 0 | 1 | 0 | 0 | | | 1 | 1 |
| 0 | 1 | 1 | 0 | 0 | 1 | 1 | 0 | 0 | | | 1 | 1 |
| 0 | 1 | 1 | 0 | 1 | 1 | 1 | 0 | 1 | | | 1 | 1 |
| 0 | 1 | 1 | 1 | 1 | 1 | 1 | 1 | 1 | | | 1 | 1 |
| 0 | 1 | 1 | 1 | 0 | 1 | 1 | 1 | 0 | | | 1 | 1 |
| 0 | 1 | 0 | 1 | 0 | 1 | 0 | 1 | 0 | | | 1 | 1 |
| 0 | 1 | 0 | 1 | 1 | 1 | 0 | 1 | 1 | | | 1 | 1 |
| 0 | 1 | 0 | 0 | 1 | 1 | 0 | 0 | 1 | | | 1 | 1 |
| 0 | 1 | 0 | 0 | 0 | 1 | 0 | 0 | 0 | | | 1 | 1 |
| 1 | 1 | 0 | 0 | 0 | 0 | 0 | 0 | 0 | | | 1 | 1 |
| 1 | 1 | 0 | 0 | 1 | 0 | 0 | 0 | 1 | | | 1 | −1 |
| 1 | 1 | 0 | 1 | 1 | 0 | 0 | 1 | 1 | | | 1 | 1 |
| 1 | 1 | 0 | 1 | 0 | 0 | 0 | 1 | 0 | | | 1 | −1 |
| 1 | 1 | 1 | 1 | 0 | 0 | 1 | 1 | 0 | | | 1 | 1 |
| 1 | 1 | 1 | 1 | 1 | 0 | 1 | 1 | 1 | | | 1 | −1 |
| 1 | 1 | 1 | 0 | 1 | 0 | 1 | 0 | 1 | | | 1 | 1 |
| 1 | 1 | 1 | 0 | 0 | 0 | 1 | 0 | 0 | | | 1 | −1 |
| 1 | 0 | 1 | 0 | 0 | 1 | 1 | 0 | 0 | | | 1 | 1 |
| 1 | 0 | 1 | 0 | 1 | 1 | 1 | 0 | 1 | | | 1 | −1 |
| 1 | 0 | 1 | 1 | 1 | 1 | 1 | 1 | 1 | | | 1 | 1 |
| 1 | 0 | 1 | 1 | 0 | 1 | 1 | 1 | 0 | | | 1 | −1 |
| 1 | 0 | 0 | 1 | 0 | 1 | 0 | 1 | 0 | | | 1 | 1 |
| 1 | 0 | 0 | 1 | 1 | 1 | 0 | 1 | 1 | | | 1 | −1 |
| 1 | 0 | 0 | 0 | 1 | 1 | 0 | 0 | 1 | | | 1 | 1 |
| 1 | 0 | 0 | 0 | 0 | 1 | 0 | 0 | 0 | | | 1 | −1 |

In addition, a channel selection for DMRS transmission may also be used with a reduced SF. For example, for PUCCH format 1a or 1b, since two PUCCH channels (SF=4) are reserved when SF=2 is used, two sequences (or channels) are reserved for DMRS, a WTRU may select one between 2 PUCCHs for DMRS transmission to indicate more ACK/NACK states or bits. Example is shown in Table 20.

TABLE 20

| b0 | b1 | b2 (state) | b3 | b4 | | DATA (SF = 2) | | | DMRS channel #1 | DMRS channel #2 |
|---|---|---|---|---|---|---|---|---|---|---|
| 0 | 0 | 0 | 0 | 0 | 0 | 0 | 0 | 0 | 1 | 0 |
| 0 | 0 | 0 | 0 | 1 | 0 | 0 | 0 | 1 | 1 | 0 |
| 0 | 0 | 0 | 1 | 1 | 0 | 0 | 1 | 1 | 1 | 0 |
| 0 | 0 | 0 | 1 | 0 | 0 | 0 | 1 | 0 | 1 | 0 |
| 0 | 0 | 1 | 1 | 0 | 0 | 1 | 1 | 0 | 1 | 0 |
| 0 | 0 | 1 | 1 | 1 | 0 | 1 | 1 | 1 | 1 | 0 |
| 0 | 0 | 1 | 0 | 1 | 0 | 1 | 0 | 1 | 1 | 0 |
| 0 | 0 | 1 | 0 | 0 | 0 | 1 | 0 | 0 | 1 | 0 |
| 0 | 1 | 1 | 0 | 0 | 1 | 1 | 0 | 0 | 1 | 0 |
| 0 | 1 | 1 | 0 | 1 | 1 | 1 | 0 | 1 | 1 | 0 |
| 0 | 1 | 1 | 1 | 1 | 1 | 1 | 1 | 1 | 1 | 0 |
| 0 | 1 | 1 | 1 | 0 | 1 | 1 | 1 | 0 | 1 | 0 |
| 0 | 1 | 0 | 1 | 0 | 1 | 0 | 1 | 0 | 1 | 0 |
| 0 | 1 | 0 | 1 | 1 | 1 | 0 | 1 | 1 | 1 | 0 |
| 0 | 1 | 0 | 0 | 1 | 1 | 0 | 0 | 1 | 1 | 0 |
| 0 | 1 | 0 | 0 | 0 | 1 | 0 | 0 | 0 | 1 | 0 |
| 1 | 1 | 0 | 0 | 0 | 0 | 0 | 0 | 0 | 0 | 1 |
| 1 | 1 | 0 | 0 | 1 | 0 | 0 | 0 | 1 | 0 | 1 |
| 1 | 1 | 0 | 1 | 1 | 0 | 0 | 1 | 1 | 0 | 1 |
| 1 | 1 | 0 | 1 | 0 | 0 | 0 | 1 | 0 | 0 | 1 |
| 1 | 1 | 1 | 1 | 0 | 0 | 1 | 1 | 0 | 0 | 1 |
| 1 | 1 | 1 | 1 | 1 | 0 | 1 | 1 | 1 | 0 | 1 |
| 1 | 1 | 1 | 0 | 1 | 0 | 1 | 0 | 1 | 0 | 1 |
| 1 | 0 | 1 | 0 | 0 | 1 | 1 | 0 | 0 | 0 | 1 |

TABLE 20-continued

| b0 | b1 | b2 (state) | b3 | b4 | | DATA (SF = 2) | | | DMRS channel #1 | DMRS channel #2 |
|---|---|---|---|---|---|---|---|---|---|---|
| 1 | 0 | 1 | 0 | 1 | 1 | 1 | 0 | 1 | 0 | 1 |
| 1 | 0 | 1 | 1 | 1 | 1 | 1 | 1 | 1 | 0 | 1 |
| 1 | 0 | 1 | 1 | 0 | 1 | 1 | 1 | 0 | 0 | 1 |
| 1 | 0 | 0 | 1 | 0 | 1 | 0 | 1 | 0 | 0 | 1 |
| 1 | 0 | 0 | 1 | 1 | 1 | 0 | 1 | 1 | 0 | 1 |
| 1 | 0 | 0 | 0 | 1 | 1 | 0 | 0 | 1 | 0 | 1 |
| 1 | 0 | 0 | 0 | 0 | 1 | 0 | 0 | 0 | 0 | 1 |

A location index using slot and channel selection for DMRS transmission may also be used with a reduced SF (e.g., SF reduction from 4 to 2). A WTRU may select one location index (i.e., slot and channel) for DMRS transmission to indicate more ACK/NACK states or bits. Table 21 shows an example of indicating 6 ACK/NACK bits by using SF=2 code for PUCCH data and DMRS channel selection in a case that two PUCCHs are allocated for a WTRU.

TABLE 21

| b0 | b1 | b2 (state) | b3 | b4 | b5 | | DATA (SF = 2) | | | Location index for DMRS transmission |
|---|---|---|---|---|---|---|---|---|---|---|
| 0 | 0 | 0 | 0 | 0 | 0 | 0 | 0 | 0 | 0 | 0 |
| 0 | 0 | 0 | 0 | 0 | 1 | 0 | 0 | 0 | 1 | 0 |
| 0 | 0 | 0 | 0 | 1 | 1 | 0 | 0 | 1 | 1 | 0 |
| 0 | 0 | 0 | 0 | 1 | 0 | 0 | 0 | 1 | 0 | 0 |
| 0 | 0 | 0 | 1 | 1 | 0 | 0 | 1 | 1 | 0 | 0 |
| 0 | 0 | 0 | 1 | 1 | 1 | 0 | 1 | 1 | 1 | 0 |
| 0 | 0 | 0 | 1 | 0 | 1 | 0 | 1 | 0 | 1 | 0 |
| 0 | 0 | 1 | 1 | 0 | 1 | 1 | 1 | 0 | 1 | 0 |
| 0 | 0 | 1 | 1 | 0 | 0 | 1 | 1 | 0 | 0 | 0 |
| 0 | 0 | 1 | 1 | 1 | 0 | 1 | 1 | 1 | 0 | 0 |
| 0 | 0 | 1 | 1 | 1 | 1 | 1 | 1 | 1 | 1 | 0 |
| 0 | 0 | 1 | 0 | 1 | 1 | 1 | 0 | 1 | 1 | 0 |
| 0 | 0 | 1 | 0 | 1 | 0 | 1 | 0 | 1 | 0 | 0 |
| 0 | 0 | 1 | 0 | 0 | 0 | 1 | 0 | 0 | 0 | 0 |
| 0 | 0 | 1 | 0 | 0 | 1 | 1 | 0 | 0 | 1 | 0 |
| 0 | 1 | 1 | 0 | 0 | 0 | 1 | 0 | 0 | 0 | 1 |
| 0 | 1 | 1 | 0 | 0 | 1 | 1 | 0 | 0 | 1 | 1 |
| 0 | 1 | 1 | 0 | 1 | 1 | 1 | 0 | 1 | 1 | 1 |
| 0 | 1 | 1 | 0 | 1 | 0 | 1 | 0 | 1 | 0 | 1 |
| 0 | 1 | 1 | 1 | 1 | 0 | 1 | 1 | 1 | 0 | 1 |
| 0 | 1 | 1 | 1 | 1 | 1 | 1 | 1 | 1 | 1 | 1 |
| 0 | 1 | 1 | 1 | 0 | 1 | 1 | 1 | 0 | 1 | 1 |
| 0 | 1 | 1 | 1 | 0 | 0 | 1 | 1 | 0 | 0 | 1 |
| 0 | 1 | 0 | 1 | 0 | 0 | 0 | 1 | 0 | 0 | 1 |
| 0 | 1 | 0 | 1 | 0 | 1 | 0 | 1 | 0 | 1 | 1 |
| 0 | 1 | 0 | 1 | 1 | 1 | 0 | 1 | 1 | 1 | 1 |
| 0 | 1 | 0 | 1 | 1 | 0 | 0 | 1 | 1 | 0 | 1 |
| 0 | 1 | 0 | 0 | 1 | 0 | 0 | 0 | 1 | 0 | 1 |
| 0 | 1 | 0 | 0 | 1 | 1 | 0 | 0 | 1 | 1 | 1 |
| 0 | 1 | 0 | 0 | 0 | 1 | 0 | 0 | 0 | 1 | 1 |
| 0 | 1 | 0 | 0 | 0 | 0 | 0 | 0 | 0 | 0 | 1 |
| 1 | 0 | 0 | 0 | 0 | 0 | 0 | 0 | 0 | 0 | 2 |
| 1 | 0 | 0 | 0 | 0 | 1 | 0 | 0 | 0 | 1 | 2 |
| 1 | 0 | 0 | 0 | 1 | 1 | 0 | 0 | 1 | 1 | 2 |
| 1 | 0 | 0 | 0 | 1 | 0 | 0 | 0 | 1 | 0 | 2 |
| 1 | 0 | 0 | 1 | 1 | 0 | 0 | 1 | 1 | 0 | 2 |
| 1 | 0 | 0 | 1 | 1 | 1 | 0 | 1 | 1 | 1 | 2 |
| 1 | 0 | 0 | 1 | 0 | 1 | 0 | 1 | 0 | 1 | 2 |
| 1 | 0 | 0 | 1 | 0 | 0 | 0 | 1 | 0 | 0 | 2 |
| 1 | 0 | 1 | 1 | 0 | 0 | 1 | 1 | 0 | 0 | 2 |
| 1 | 0 | 1 | 1 | 0 | 1 | 1 | 1 | 0 | 1 | 2 |
| 1 | 0 | 1 | 1 | 1 | 1 | 1 | 1 | 1 | 1 | 2 |
| 1 | 0 | 1 | 1 | 1 | 0 | 1 | 1 | 1 | 0 | 2 |
| 1 | 0 | 1 | 0 | 1 | 0 | 1 | 0 | 1 | 0 | 2 |
| 1 | 0 | 1 | 0 | 1 | 1 | 1 | 0 | 1 | 1 | 2 |
| 1 | 0 | 1 | 0 | 0 | 1 | 1 | 0 | 0 | 1 | 2 |
| 1 | 0 | 1 | 0 | 0 | 0 | 1 | 0 | 0 | 0 | 2 |
| 1 | 1 | 1 | 0 | 0 | 0 | 1 | 0 | 0 | 0 | 3 |
| 1 | 1 | 1 | 0 | 0 | 1 | 1 | 0 | 0 | 1 | 3 |

TABLE 21-continued

| b0 | b1 | b2 | b3 | b4 | b5 (state) | DATA (SF = 2) | | | | Location index for DMRS transmission |
|---|---|---|---|---|---|---|---|---|---|---|
| 1 | 1 | 1 | 0 | 1 | 1 | 0 | 0 | 1 | 1 | 3 |
| 1 | 1 | 1 | 0 | 1 | 0 | 0 | 0 | 1 | 0 | 3 |
| 1 | 1 | 1 | 1 | 1 | 0 | 0 | 1 | 1 | 0 | 3 |
| 1 | 1 | 1 | 1 | 1 | 1 | 0 | 1 | 1 | 1 | 3 |
| 1 | 1 | 1 | 1 | 0 | 1 | 0 | 1 | 0 | 1 | 3 |
| 1 | 1 | 1 | 1 | 0 | 0 | 0 | 1 | 0 | 0 | 3 |
| 1 | 1 | 0 | 1 | 0 | 0 | 1 | 1 | 0 | 0 | 3 |
| 1 | 1 | 0 | 1 | 0 | 1 | 1 | 1 | 0 | 1 | 3 |
| 1 | 1 | 0 | 1 | 1 | 1 | 1 | 1 | 1 | 1 | 3 |
| 1 | 1 | 0 | 1 | 1 | 0 | 1 | 1 | 1 | 0 | 3 |
| 1 | 1 | 0 | 0 | 1 | 0 | 1 | 0 | 1 | 0 | 3 |
| 1 | 1 | 0 | 0 | 1 | 1 | 1 | 0 | 1 | 1 | 3 |
| 1 | 1 | 0 | 0 | 0 | 1 | 1 | 0 | 0 | 1 | 3 |
| 1 | 1 | 0 | 0 | 0 | 0 | 1 | 0 | 0 | 0 | 3 |

In Tables 19, 20, and 21, the PUCCH data part may accommodate 4 (coded) bits by using an SF=2 orthogonal code. In accordance with another embodiment, instead of repeating the same bits in two slots of a subframe, bits may be coded and different coded bits may be transmitted on two slots of the subframe, therefore up to 8 (coded) bits may be transmitted by the WTRU on one PUCCH.

Multiple ACK/NACK bits may be jointly coded or ACK/NACK/DTX states may be jointly coded across two slots in a subframe, using block coding such as Reed Muller code, Simplex code, or any other code, (i.e., a number of ACK/NACK bits may be coded into 8 (or more) bits). As stated above, the PUCCH data part with a SF=2 orthogonal code may accommodate 8 (coded) bits without using DMRS modulation, DMRS channel selection, or location index for DMRS. More than 8 (coded) bits may be accommodated if DMRS modulation, DMRS channel selection, or location index for DMRS is used.

SF reduction may be used in frequency domain to increase payload size per WTRU or WTRU multiplexing gain. SF may be reduced for cyclic shift code spread in subcarriers for RB to accommodate more bit payload or more WTRUs. A combination of SF reduction in frequency and time domain is also possible to further increase the payload size per WTRU or WTRU multiplexing gain.

In accordance with one embodiment, a WTRU may use additional time-domain orthogonal (cover) codes for ACK/NACK data in combination with DMRS time-domain orthogonal (cover) codes freed up and reassigned to the WTRU to increase WTRU multiplexing gain. For example, Table 22 may be used for LTE Rel10. In Rel8 LTE, three time-domain orthogonal (cover) codes are used for PUCCH ACK/NACK data. They are codes corresponding to sequence index 0, 1 and 2 in Table 22. Additional time-domain orthogonal (cover) code may be introduced, (e.g., sequence index 3 in Table 22), for PUCCH ACK/NACK data and be allocated to the WTRU. In order to increase the WTRU multiplexing gain, an enhanced capability for DMRS to support this feature may be introduced. A WTRU that may access the additional time-domain orthogonal (cover) code for data may also be able to access orthogonal (cover) code for DMRS to pair with the data orthogonal code. More than one DMRS orthogonal (cover) codes may be available for WTRUs operating with SF reduction, but one orthogonal (cover) code may be needed for DMRS for those WTRUs operating with SF reduction (or multi-code transmission from the same WTRU). In this case, the redundant code for DMRS for those WTRUs operating with SF reduction (or multi-code transmission from the same WTRU) may be reassigned to other WTRUs who may use the additional time-domain orthogonal (cover) code for data. By doing so, an increased number of mixed WTRUs with or without reduced SF transmission may be supported.

SF reduction in time domain, (e.g., reduction of SF from 4 to 2), may increase payload size per WTRU or WTRU multiplexing gain for carrier aggregation in Rel10 LTE-A. In Rel8 LTE system there are three time-domain orthogonal (cover) sequences supported for ACK/NACK data in PUCCH format 1a and 1b because DMRS supports three time-domain orthogonal (cover) sequences. In Rel8 LTE, the total number of WTRUs that may be supported is 18 (i.e., 6 cyclic shift codes times 3 time-domain orthogonal (cover) sequences) assuming cyclic delta shift is two and each WTRU occupies one combination of cyclic shift code and time-domain orthogonal (cover) code. This is true for both data and DMRS for each WTRU. The same number of WTRUs (e.g., 18) may be supported for data and DMRS in Rel8. The WTRU multiplexing capacity or gain are exactly matched between the data part and the DMRS. In Rel10 LTE-A, in order to support more than 1 component carrier (CC) or 2 ACK/NACK (coded) bits for carrier aggregation per WTRU, SF reduction may be used (e.g., from 4 to 2). For example in Rel8, SF reduction from 4 to 2 may support 12 WTRUs (i.e., 6 cyclic shift codes times 2 orthogonal (cover) sequences of SF=2) per resource block (RB).

SF reduction from 4 to 2 may reduce the efficiency for resource allocation achievable in Rel8 LTE. For instance, if there is a single Rel10 LTE-A WTRU is assigned an SF=2 code in an RB, other a WTRU in the same RB may be assigned an SF=2 code as well in order to achieve the optimum resource utilization efficiency. In this case, Rel8 LTE WTRUs and Rel10 LTE-A WTRUs may not be multiplexed together in the same RB since Rel8 WTRUs cannot support SF=2. However, with reduced resource utilization efficiency, Rel10 LTE-A WTRUs may uses SF=2 orthogonal (cover) code [+ −] and other Rel8 WTRUs may use SF=4 orthogonal (cover) code [+ + + +] or sequence index 0. Rel10 LTE-A WTRUs with SF=2 orthogonal (cover) code [+ −] blocks those two orthogonal (cover) codes [+ − + −] and [+ − − +], (i.e., sequence index 1 and 2 in Table 22). This supports 12 WTRUs per RB with half of the WTRUs having low payload. By using the embodiments disclosed herein, another WTRU, (e.g., rel8 WTRU or rel10 WTRU without carrier aggregation), may use SF=4 orthogonal (cover) code [+ + − −] (or sequence index 3 in Table 22). Thus, 18 WTRUs per RB may be supported. A 50% increase in WTRU multiplexing gain or in number of WTRUs supported per RB may be achieved.

SF reduction with SF=2 consumes two codes of SF=4 for data but they may need single time-domain orthogonal (cover) code for DMRS for channel estimation at the eNodeB. This is because channel response is the same if signals are coming from the same WTRU. Therefore, the WTRU multiplexing gain may be increased by introducing additional time-domain orthogonal (cover) code to WTRUs and freeing up some time-domain orthogonal (cover) code for DMRSs to be used by other WTRUs. This is because the DMRS is the bottleneck for the maximum number of WTRUs that may be supported per RB in Rel8 LTE. Under the current Rel8 LTE specification, three time domain orthogonal (cover) codes (SF=3) are used for DMRS, and three of the four SF=4 time-domain orthogonal (cover) codes are used for the PUCCH data part. By introducing one more time-domain orthogonal (cover) code to PUCCH data part (i.e., introducing the forth time-domain orthogonal (cover) code [+1 +1, −1 −1] or orthogonal index 3 of Table 22 or use four time-domain orthogonal (cover) codes for PUCCH data part instead of three in Table 22), the total number of WTRUs that may be supported per RB is increased from 12 to 18 (6 cyclic shift codes times 3) assuming cyclic delta shift is two. A 50% increase in WTRU multiplexing gain is achieved using the described method. Therefore, it may achieve an optimal resource allocation efficiency when Rel10 LET-A and Rel8 WTRUs are multiplexed in the same RB. For example, one Rel10 LTE-A WTRU uses SF=2 with orthogonal (cover) code [+ −], the other Rel8 WTRUs may be assigned two orthogonal (cover) code [+ + + +] or [+ + − −], (i.e., sequence index 0 and 3 in Table 22), even though a particular Rel10 LTE-A WTRU with [+ −] orthogonal code blocks two other orthogonal (cover) codes, (i.e., [+ − + −] and [+ − − +] sequence index 1 and 2 in Table 22). Since SF reduction with SF=2 consumes two codes of SF=4 for data but they may need a single code for DMRS for channel estimation in the eNodeB. Hence, the unused code for DMRS may be assigned to support other Rel8 WTRU in the same RB. In this way, it may achieve the optimal resource allocation efficiency.

Alternatively, it may be possible to utilize SF reduction (SF=2) to support 12 WTRUs per RB for all WTRUs supporting 2 CCs, wherein each WTRU uses SF=2 code (or equivalently uses two SF=4 codes) that may carry four ACK/NACK (coded) bits (if ACK/NACK (coded) bits are repeated for the second slot) or eight ACK/NACK (coded) bits (if ACK/NACK (coded) bits are not repeated in the second slot). For example, the WTRU may use SF=2 code consuming two SF=4 codes using sequence index 1 and 2, or the WTRU may use another SF=2 code consuming two SF=4 codes using sequence index 0 and 3 in Table 22. The WTRU may use one of the two orthogonal codes or cyclic shift codes for DMRS that are associated with orthogonal codes of sequence index 1 and 2 in Table 22 for data when orthogonal codes of sequence index 1 and 2 in Table 22 are assigned to a WTRU for SF=2 ACK/NACK transmission. The WTRU may use the cyclic shift code or orthogonal code for DMRS that is associated with orthogonal code of sequence index 0 in Table 22 for data when orthogonal codes of sequence index 0 and 3 in Table 22 are assigned to a WTRU for SF=2 transmission. It may also be possible to utilize SF reduction (i.e., SF=2) to support six WTRUs and use SF=4 to support twelve other WTRUs per RB (so total 18 WTRUS per RB). For example, a WTRU may use SF=2 code (consuming two SF=4 codes) using sequence index 1 and 2 in Table 22, and another WTRU may use SF=4 code using sequence index 0 in Table 22, and yet another WTRU may use SF=4 code using sequence index 3 in Table 22. The WTRU using the SF=2 code may use one of the two codes for DMRS that are associated with the orthogonal codes of sequence index 1 and 2 in Table 22 for data when orthogonal codes of sequence index 1 and 2 in Table 22 are assigned to a WTRU for SF=2 ACK/NACK transmission. The WTRU may free up the other one of the two codes for DMRS that are associated with the orthogonal codes of sequence index 1 and 2 in Table 22 for another WTRU since one code for DMRS would be necessary. The WTRU may use the cyclic shift code or orthogonal code for DMRS that is associated with orthogonal code of sequence index 0 in Table 22 for data when orthogonal codes of sequence index 0 in Table 22 is assigned to a WTRU for SF=4 transmission. The WTRU may use the cyclic shift code or orthogonal code for DMRS that is associated with orthogonal code of sequence index 3 in Table 22 for data when orthogonal codes of sequence index 3 in Table 22 is assigned to a WTRU for another SF=4 transmission. Other combinations are also possible.

TABLE 22

| Sequence index | Orthogonal sequences | | | |
|---|---|---|---|---|
| 0 | +1 | +1 | +1 | +1 |
| 1 | +1 | −1 | +1 | −1 |
| 2 | +1 | −1 | −1 | +1 |
| 3 | +1 | +1 | −1 | −1 |

Although embodiments above are illustrated with 2 PUCCH channels, channel selection and reduced SF, it should be noted that the embodiments can be extended to any number of PUCCH channels (e.g., 4 channels).

Although features and elements are described above in particular combinations, each feature or element can be used alone without the other features and elements or in various combinations with or without other features and elements. The methods or flow charts provided herein may be implemented in a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) or Ultra Wide Band (UWB) module.

What is claimed is:

1. A wireless transmit/receive unit (WTRU) for providing carrier aggregation based hybrid automatic repeat request (HARQ) feedback, the WTRU comprising:
   a processor, the processor configured to:
      receive a plurality of codewords based on information on a downlink control channel;
      determine positive/negative acknowledgements (ACK/NACKs) for the codewords based on decoding results of the codewords;
      generate a bundled ACK/NACK for a group of ACK/NACKs, wherein a bundled ACK is generated on a condition that all codewords belonging to the group are successfully decoded and a bundled NACK is generated on a condition that at least one codeword belonging to the group is not successfully decoded;

select a physical uplink control channel (PUCCH) format 1b resource and set the carrier aggregation based HARQ feedback using the bundled ACK/NACK; and send the carrier aggregation based HARQ feedback via the selected PUCCH format 1b resource.

2. The WTRU of claim 1 wherein the ACK/NACKs are grouped into two groups.

3. The WTRU of claim 1, wherein the processor is further configured to:
receive an indication of a number of downlink control channels for the group of ACK/NACKs, wherein the bundled NACK is further generated on a condition that a number of decoded downlink control channels of the ACK/NACK group is not equal to the indication of the number of downlink control channels.

4. The WTRU of claim 1, wherein the processor is further configured to:
send an indication of a number of downlink control channels for the group of ACK/NACKs.

5. The WTRU of claim 1, wherein the processor is further configured to:
group the bundled ACK/NACK into a bundled ACK/NACK group, wherein the PUCCH format 1b resource is selected for the bundled ACK/NACK group.

6. An evolved NodeB (eNB) for receiving carrier aggregation based hybrid automatic repeat request (HARQ) feedback, the eNB comprising:
a transmitter configured to send information on a downlink control channel;
the transmitter further configured to send a plurality of codewords to a wireless transmit/receive unit (WTRU) based on the information transmitted on the downlink control channel; and
a receiver configured to receive, via a physical uplink control channel (PUCCH) format 1b resource, a carrier aggregation based HARQ feedback comprising a bundled ACK/NACK for the codewords based on the WTRU's decoding results of the codewords, wherein ACK/NACKs are grouped and the bundled ACK/NACK is received for a group of ACK/NACKs, wherein a bundled ACK is received on a condition that all codewords belonging to the group are successfully decoded and a bundled NACK is received on a condition that at least one codeword belonging to the group is not successfully decoded by the WTRU.

7. The eNB of claim 6 wherein the transmitter is configured to send an indication of a number of downlink control channels for the group of ACK/NACKs.

8. The eNB of claim 6 wherein the receiver is further configured to receive an indication of a number of downlink control channels for the group of ACK/NACKs.

9. A wireless transmit/receive unit (WTRU) for providing carrier aggregation based hybrid automatic repeat request (HARD) feedback, the WTRU comprising:
a processor, the processor configured to:
determine that the WTRU is configured to use carrier aggregation via a first downlink (DL) component carrier and a second (DL) component carrier;
receive a first codeword via the first DL component carrier;
receive a second codeword via the second DL component carrier;
group the first DL component carrier and second DL component carrier into a carrier group;
generate a bundled acknowledgement/non-acknowledgement (ACK/NACK) for the first DL component carrier and the second DL component carrier using the first codeword and the second codeword; and
send the bundled ACK/NACK using physical uplink control channel (PUCCH) format 1b with channel selection.

10. The WTRU of claim 9, wherein the processor is further configured to determine a number of HARQ-ACK bits based on the first component carrier.

11. The WTRU of claim 10, wherein the processor is further configured to determine the number of HARQ-ACK bits based on the first component carrier by:
determining that the first component carrier supports up to two transport blocks; and
setting the number of HARQ-ACK bits to two.

12. The WTRU of claim 10, wherein the processor is further configured to determine the number of HARQ-ACK bits based on the first component carrier by:
determining that a configured serving cell supports a transport block; and
setting the number of HARQ-ACK bits to one.

13. The WTRU of claim 9, wherein the processor is further configured to determine a number of HARQ-ACK bits based on the first component carrier and the second component carrier.

14. The WTRU of claim 9, wherein the processor is further configured to receive a message indicating that the WTRU should use PUCCH format 1b with channel selection.

15. A method for providing carrier aggregation based hybrid automatic repeat request (HARD) feedback, the method comprising:
determining that a wireless transmit/receive unit (WTRU) is configured to use carrier aggregation via a first downlink (DL) component carrier and a second (DL) component carrier;
receiving a first codeword via the first DL component carrier;
receiving a second codeword via the second DL component carrier;
grouping the first DL component carrier and second DL component carrier into a carrier group;
generating a bundled acknowledgement/non-acknowledgement (ACK/NACK) for the first DL component carrier and the second DL component carrier using the first codeword and the second codeword; and
sending the bundled ACK/NACK using physical uplink control channel (PUCCH) format 1b with channel selection.

16. The method of claim 15, further comprising determining a number of HARQ-ACK bits based on the first component carrier.

17. The method of claim 16, wherein determining the number of HARQ-ACK bits based on the first component carrier further comprises:
determining that the first component carrier supports up to two transport blocks; and
setting the number of HARQ-ACK bits to two.

18. The WTRU of claim 16, wherein determining the number of HARQ-ACK bits based on the first component carrier further comprises:
determining that a configured serving cell supports a transport block; and
setting the number of HARQ-ACK bits to one.

19. The method of claim 15, further comprising determining a number of HARQ-ACK bits based on the second component carrier.

20. The method of claim 15, further comprising determining a number of HARQ-ACK bits based on the first component carrier and the second component carrier.

21. The WTRU of claim 15, further comprising receiving a message indicating that the PUCCH format 1*b* with channel selection should be used.

\* \* \* \* \*

UNITED STATES PATENT AND TRADEMARK OFFICE
CERTIFICATE OF CORRECTION

PATENT NO. : 9,960,896 B2  
APPLICATION NO. : 13/970012  
DATED : May 1, 2018  
INVENTOR(S) : Kyle Jung-Lin Pan et al.

Page 1 of 1

It is certified that error appears in the above-identified patent and that said Letters Patent is hereby corrected as shown below:

Column 27, Line 55, Claim 9: replace "HARD" with "HARQ"  
    Column 28, Line 31, Claim 15: replace "HARD" with "HARQ"

Signed and Sealed this  
Twenty-fourth Day of July, 2018

Andrei Iancu  
*Director of the United States Patent and Trademark Office*